United States Patent [19]
Morita et al.

[11] Patent Number: 6,085,063
[45] Date of Patent: Jul. 4, 2000

[54] DIGITAL IMAGE FORMING APPARATUS

[75] Inventors: Kiwamu Morita, Minamikawachi-gun; Yoshinori Hayashi, Soraku-gun; Michiyuki Suzuki, Yamatokoriyama, all of Japan

[73] Assignee: Sharp Kabushiki Kaisha, Osaka, Japan

[21] Appl. No.: 09/039,026

[22] Filed: Mar. 13, 1998

[30] Foreign Application Priority Data

Mar. 18, 1997 [JP] Japan ................................. 9-064795

[51] Int. Cl.$^7$ .................................................. G03G 15/00
[52] U.S. Cl. ........................ 399/381; 399/177; 399/405; 355/40
[58] Field of Search ............................... 355/27, 40, 407; 271/265.01, 258.01; 347/3, 129; 399/405, 85, 125, 124, 381, 177, 51; 358/474

[56] References Cited

U.S. PATENT DOCUMENTS

| | | | |
|---|---|---|---|
| 4,945,390 | 7/1990 | Hasegawa et al. | 355/321 |
| 5,438,435 | 8/1995 | Lawniczak | 358/496 |
| 5,581,342 | 12/1996 | Yamauchi | 355/298 |
| 5,797,068 | 8/1998 | Otsuki et al. | 399/110 |
| 5,839,044 | 11/1998 | Taruki | 399/361 |
| 5,960,246 | 9/1999 | Kasahara et al. | 399/359 |

FOREIGN PATENT DOCUMENTS

| | | |
|---|---|---|
| 6-48591 | 2/1994 | Japan . |
| 2505838 | 4/1996 | Japan . |
| 2505838 B2 | 4/1996 | Japan . |

*Primary Examiner*—Safet Metjahic
*Assistant Examiner*—Khaled Brown
*Attorney, Agent, or Firm*—David G. Conlin; David A. Tucker; Dike, Bronstein, Roberts & Cushman, LLP

[57] ABSTRACT

A document scanning unit is disposed so that a scanning direction of a document on a table glass by a lamp unit is equal to a longitudinal direction of a photoreceptor drum provided in a mechanism unit. A face-down tray is mounted above the document scanning unit, and a face-up tray is positioned on a side of the apparatus opposite to the face-down tray with respect to the mechanism unit. The discharge-opening switching section switches the discharge openings so that a recording sheet is discharged to the face-down tray in a printer mode, or to the face-up tray in a copy mode. This structure enables a reduction in the size of an image forming apparatus by decreasing the width of the apparatus without increasing the height thereof. Moreover, with this structure, it is possible to perform the discharge of sheets according to operation modes, namely the printer mode and the copy mode.

34 Claims, 23 Drawing Sheets

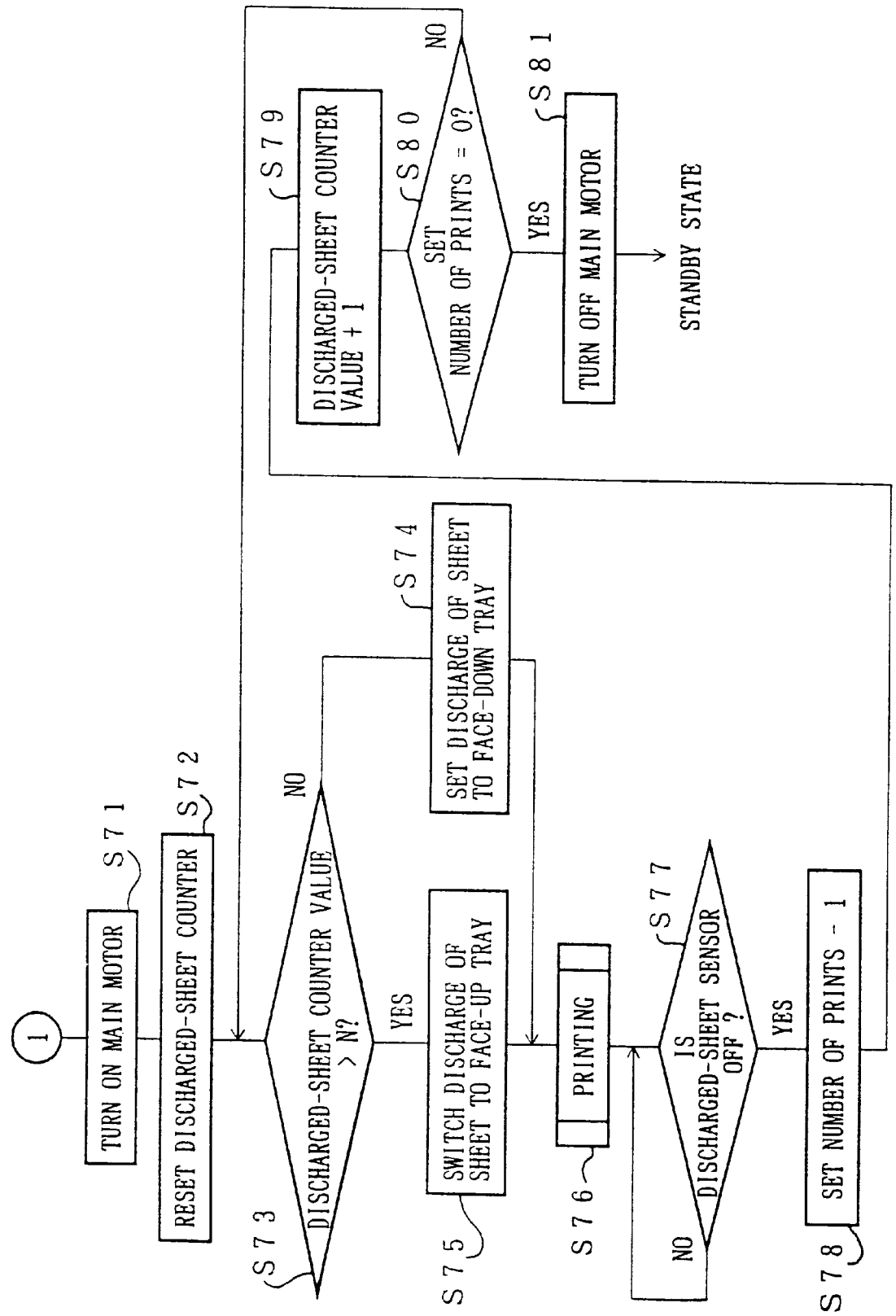

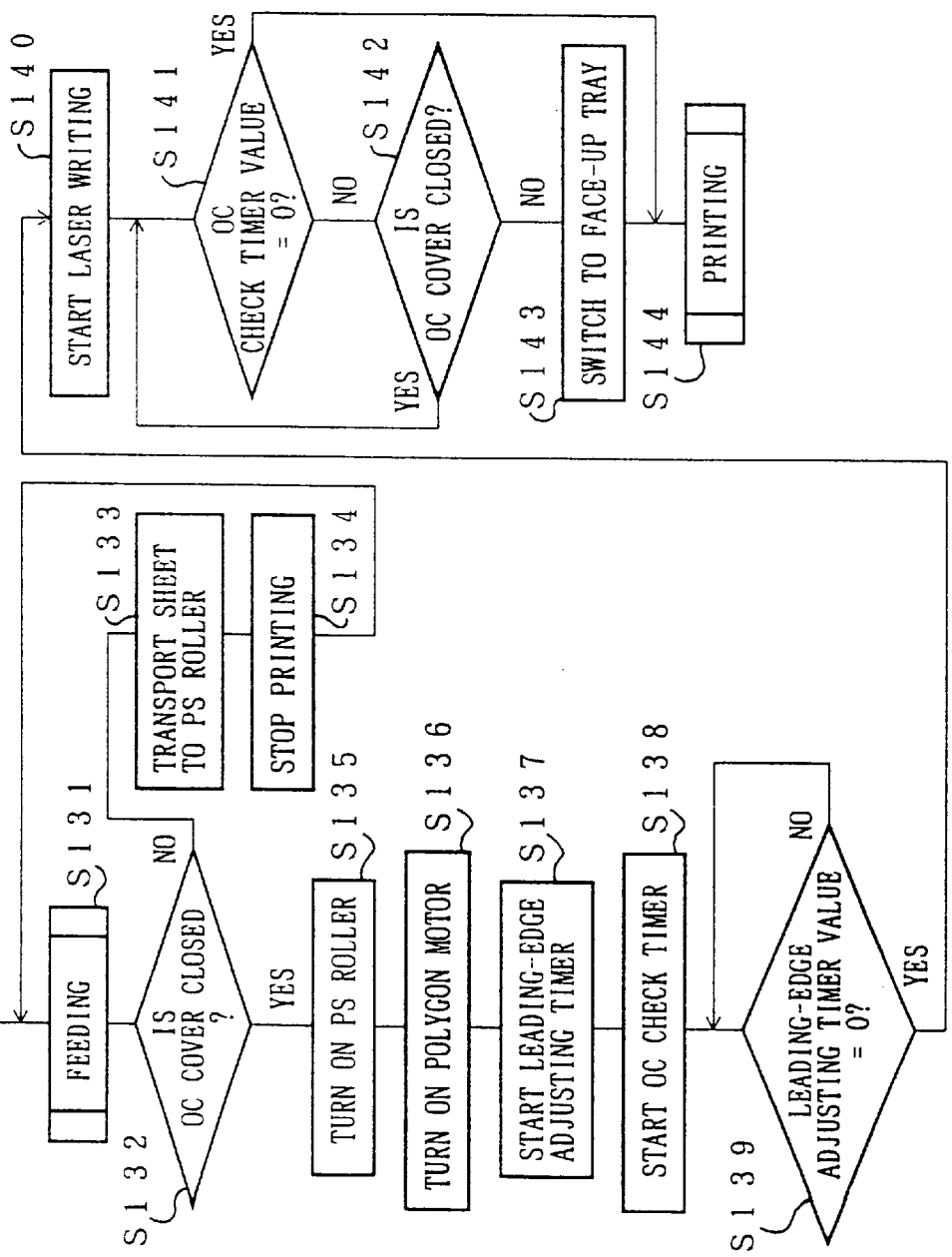

DIGITAL IMAGE FORMING APPARATUS

FIELD OF THE INVENTION

The present invention relates to digital image forming apparatuses such as digital copying machines and multi-function machines having a document platen.

BACKGROUND OF THE INVENTION

In a typical office, a conventional laser-beam printer as an output device of, for example, an information processing system is connected to a personal computer so as to carry out normal office tasks.

The image forming process using such a printer includes forming a toner image of character information by causing toner to adhere to an electrostatic latent image formed on a photoreceptor, and printing the toner image on a recording sheet fed from a feed cassette, etc. At this time, the toner is not completely printed on the recording sheet, and a small amount of residual toner remaining on the photoreceptor surface is collected by a collecting device and fed back to a developing device for reuse. According to this image forming process, paper dust is collected together with the residual toner. However, when the toner image contains only character information, even if the toner contains paper dust, the quality of the image on the recording sheet does not deteriorate.

However, when graphics are formed using a personal computer, the graphics are often painted out partially, and thus paint-out portions are produced. Therefore, when the image information includes character information and graphics, a problem arises, more particularly the paper dust contained in the toner degrades the image quality of the graphics extremely.

In order to solve such a problem, it has been proposed to produce good quality images of graphics and character information by using a digital copying machine that can be connected to a telephone line, instead of the conventional printer. In the digital copying machine, as illustrated in FIG. 23(a), a fixing unit and an electrophotographic processing unit are disposed side by side above the feed cassette located on the lowest stage of the main body. Furthermore, a laser write unit and a document scanning unit are arranged in this order on the fixing and electrophotographic processing units. However, since the printer is usually placed beside the personal computer, even if a digital copying machine is desired to be used instead of the printer, in practice it is difficult to use the above-mentioned digital copying machine because it is too large.

Then, a digital copying machine shown in FIG. 23(b) is proposed. This machine is made compact by forming the transport path of recording sheet in the L shape to decrease the height of the copying machine main body. The structure of this digital copying machine is described in detail in Japanese Patent No. 2505838.

As illustrated in FIG. 24, in the digital copying machine, a feed cassette 201 is disposed on the lowest stage, and a laser write unit 202, a document scanning unit 203, and an OC cover 204 are arranged in this order above the feed cassette 201. An electrophotographic processing unit 206 and a fixing unit 207 are arranged vertically beside a block of the feed cassette 201, laser write unit 202, document scanning unit 203, and OC cover 204.

The feed cassette 201 can be pulled out from the front face of the copying machine main body (i.e., in a direction perpendicular to the paper surface of FIG. 24 with the upper side thereof facing up). The document scanning unit 203 includes a table glass 211, a lamp unit 212, an optical system 213 formed by a mirror, etc., and a lens unit 214. The lamp unit 212 includes an exposure lamp and lens, and performs scanning from the left side toward the right side (toward the fixing unit 207) of the copying machine main body. The laser write unit 202 includes a polygon motor 215, a polygon mirror 216, and a lens 217. In the above-mentioned structure, an electrostatic latent image is formed on a photoreceptor drum 218 in the electrophotographic processing unit 206.

Next, the following description will explain the transport path (shown by the B' arrow) of recording sheet in the digital copying machine having the above-mentioned structure. The recording sheets stored in the feed cassette 201 are fed one sheet at a time to register rollers 220 by a pickup roller 219. On the other hand, recording sheets placed on a manual-feed tray 208 are fed one sheet at a time to the register rollers 220 by a manual-feed roller 221. The recording sheet registered by the register rollers 220 is transported to the photoreceptor drum 218 on which the toner image is formed by a development roller 222a in a developing device 222. The toner image is transferred to the recording sheet transported to the photoreceptor drum 218 by a transfer device, not shown. Thereafter, the toner image is fixed by fixing rollers 223 in the fixing unit 207, and the recording sheet carrying the toner image fixed thereon is fed to a discharge tray 209 by discharge rollers 224 provided on the upper right side of the copying machine main body (beside the discharge tray 209).

In this structure, the height of the copying machine main body is decreased by arranging vertically the electrophotographic processing unit 206 and fixing unit 202 in the right side of the copying machine main body. Therefore, for example, even when a user sits in front of the personal computer, the user can take the recording sheet from the discharge tray 209 by stretching out its hand without standing up.

However, the above-mentioned conventional digital copying machine suffers from a problem that the width thereof is increased with a decrease in the height of the copying machine main body. More specifically, as shown in FIG. 24, supposing that the width of a digital copying machine whose height is not reduced is $W_1$, the width of a digital copying machine of the above-mentioned structure is increased by $W_2$ that is the width of the electrophotographic processing unit 206 and fixing unit 207. When the digital copying machine of the increased width is placed beside the personal computer, it occupies an excess installation space in a typical office. It is therefore difficult to actually use such a digital copying machine instead of the printer. Moreover, since the document scanning unit 203 is wider than the feed cassette 201 and laser write unit 202, a void is produced in the lower left side of the copying machine. Thus, the weight balance is upset between the right and left sides of the copying machine main body. Furthermore, since only one discharge tray 209 is provided, it is impossible to perform a discharge operation according to each of the printer mode and copy mode.

In order to solve the above problems, a digital copying machine shown in FIGS. 23(c) and 25 is proposed. This digital copying machine is made compact by providing a discharge box 209' between the document scanning unit 203 and laser write unit 202 so as to decrease the width of the copying machine main body. In FIG. 25, for the sake of convenience of explanation, members having the same function as the members shown in FIG. 24 are designated by the same codes.

The following description will explain the transport path (shown by the A' arrow) of the recording sheet in the digital copying machine having the above-mentioned structure. The recording sheets stored in the feed cassette 201 are subjected to a fixing operation by the fixing rollers 223 in the fixing unit 207. The recording sheet carrying an image fixed thereon is fed to the discharge box 209' through discharge rollers 224' provided beside the discharge box 209'.

According to this structure, since the document scanning unit 203 is provided on the discharge box 209' and fixing unit 207 arranged beside the discharge box 209', it is possible to prevent an increase in the width of the copying machine main body.

However, in the digital copying machine of this structure, in order to prevent an increase in the width of the copying machine main body, the document scanning unit 203 is provided on the discharge box 209'. Therefore, the position of the document scanning unit 203 is higher than the position thereof in a conventional structure. When the position of the document scanning unit 203 becomes higher, the surface of the table glass 211 upon which a document is to be placed becomes higher as a matter of course. Therefore, the user of this copying machine needs to stand up whenever using the copy function. Hence, in comparison to a printer that can be operated by the user seated, it is not convenient to use this digital copying machine. Moreover, since only one discharge box 209' is provided, it is impossible to achieve the discharge operation according to the operation modes, namely the printer mode and copy mode.

SUMMARY OF THE INVENTION

A first object of the present invention is to provide a handy compact digital image forming apparatus by decreasing the height and width of the main body of the apparatus.

In order to achieve the first object, a digital image forming apparatus of the present invention includes: a feed section for feeding a recording sheet; a document scanning section for reading an image on a document by scanning the document; a write section, located between the feed section and the document scanning section, for writing image data of the document; and a mechanism section having an image carrier for carrying a developer image formed according to the image data written by the write section, for transferring and fixing the developer image to the recording sheet, the mechanism section being located beside a block of the feed section, write section and document scanning section which are arranged vertically, and is characterized by that the scanning direction of the document by the document scanning section is equal to a longitudinal direction of the image carrier of the mechanism section.

In this structure, the image on the document is read by scanning the document in the document scanning section, and the read image data is written on the image carrier of the mechanism section by the write section. As a result, a developer image corresponding to the image data is formed on the image carrier. Meanwhile, in the mechanism section, the developer image is transferred and fixed to a recording sheet fed from the feed section. With this series of the operations, the image of the document is recorded on the recording sheet.

Here, since the mechanism section is disposed beside the block of the feed section, write section and document scanning section which are arranged vertically, it has an L-shaped transport path. Hence, the width of the digital image forming apparatus when seen from the front side of the main body of the apparatus depends on the width of the document scanning section and mechanism section. In general, a length of the document scanning section in the scanning direction is longer than a length thereof in a direction orthogonal to the scanning direction. In this structure, since the scanning direction of the document in the document scanning section is equal to the longitudinal direction of the image carrier of the mechanism section, the longitudinal direction of the document scanning section is the same as the longitudinal direction of the image carrier.

Thus, with the structure of the present invention, the width of the main body of the apparatus is determined by the length of the document scanning section in a transverse direction, i.e., a direction along the shorter side thereof. Therefore, it is possible to minimize the width of the main body as compared to a conventional structure in which the width of the main body of the apparatus is determined by the length in the longitudinal direction of the document scanning section. As a result, the width of the main body is reduced and the size of the apparatus is decreased without reducing the effect of decreasing the height from the feed section to the document scanning section produced by the L-shaped transport path, and the user can easily handle the apparatus. Moreover, since this apparatus is a digital image forming apparatus, even when the scanning direction of the document is arranged to be equal to the longitudinal direction of the image carrier, the optical system is not complicated.

Furthermore, the conventional structure suffers from a drawback that the weight balance of the apparatus is upset between the right side and left side of the apparatus because the document scanning section is wider than the feed section and write section. In contrast, in the structure of the present invention, since the width of the main body of the apparatus is determined by the length in the transverse direction of the document scanning section, it is possible to arrange the width of the document scanning section to be almost equal to the width of the feed section or the write section. As a result, the right and left sides of the apparatus are balanced.

Additionally, in order to achieve the first object, a digital image forming apparatus of the present invention includes: a feed section for feeding a recording sheet; a document scanning section for reading an image on a document by scanning the document; a write section, located between the feed section and the document scanning section, for writing image data of the document; and a mechanism section for transferring and fixing a developer image formed according to the image data written by the write section, the mechanism section being located beside a block of the feed section, write section and document scanning section which are arranged vertically, and is characterized by that a longitudinal direction of a document placed on the document scanning section and a longitudinal direction of the recording sheet stored in the feed section cross each other at a right angle.

In this structure, like the above-mentioned structure, the image of the document is recorded on the recording sheet.

In general, a length of the document scanning section (a length in the longitudinal direction of the document scanning section) corresponding to a longitudinal direction of the document is longer than a length of the feed section corresponding to a longitudinal direction of a recording sheet. In the conventional structure, the width of the document scanning section is larger than the width of the feed section because the longitudinal direction of the document placed on the document scanning section is parallel to the longitudinal direction of the recording sheet stored in the feed section. On the other hand, in the structure of the present invention, since the longitudinal direction of the document placed on the document scanning section is orthogonal to the longitudinal direction of the recording sheet stored in the feed section, the transverse direction of the document scanning section is parallel to the longitudinal direction of the feed section.

Therefore, like the above-mentioned structure, with this structure, it is possible to decrease the width of the main body of the apparatus and reduce the size of the apparatus without reducing the effect of decreasing the height from the feed section to the document scanning section produced by the L-shaped transport path. Consequently, the user can easily handle the apparatus. Moreover, since the width of the document scanning section can be made similar to the width of the feed section or the write section, the right and left sides of the apparatus is balanced.

It is a second object of the present invention to provide a handy compact digital image forming apparatus by achieving a discharge operation that is performed according to the operation modes, namely printer mode and copy mode.

In order to achieve the second object, a digital image forming apparatus of the present invention includes: a feed section for feeding a recording sheet; a document scanning section for reading an image on a document by scanning the document; a write section, located between the feed section and the document scanning section, for writing image data of the document or image data from an external device; a mechanism section for transferring and fixing a developer image formed according to the image data written by the write section to the recording sheet, the mechanism section being located beside a block of the feed section, write section and document scanning section which are arranged vertically; a first discharge section and a document cover provided above the document scanning section; a second discharge section disposed on a side of the apparatus opposite to the first discharge section with respect to the mechanism section; and a discharge-opening switching section for switching discharge openings so that the recording sheet is discharged with its image-recorded side facing down to the first discharge section during a printer mode for recording the image data from the external device, and the recording sheet is discharged with the image-recorded side facing up to the second discharge section during a copy mode for recording the image data of the document.

According to this structure, in the copy mode, the image of the document read by the document scanning section is recorded on the recording sheet, and discharged to the second discharge section by the discharge-opening switching section. On the other hand, in the printer mode, an image corresponding to the image data transmitted from an external device is recorded on the recording sheet, and discharged to the first discharge section by the discharge-opening switching section.

In a conventional structure, since only one discharge section is provided, it is impossible to perform discharge operations according to the respective operation modes, namely the printer mode and copy mode. However, with the structure of the present invention, since the discharge operations according to each of the printer mode and copy mode are achieved, the user can easily handle the apparatus.

Moreover, in general, the volume of the recording sheets discharged to the discharge section is less in the printer mode than in the copy mode. Accordingly, it is possible to decrease the height of the first discharge section provided above the document scanning section.

Furthermore, in the printer mode, since the recording sheets are discharged with their image-recorded side facing down, the page order of a set of prints is not reversed. On the other hand, in the copy mode, since the recording sheet is discharged with the image-recorded side facing up, it is possible to immediately confirm the copy state.

For a fuller understanding of the nature and advantages of the invention, reference should be made to the ensuing detailed description taken in conjunction with the accompanying drawings.

BRIEF DESCRIPTION OF THE DRAWINGS

FIG. 10 is a flow chart of a switching operation of a digital copying machine according to Embodiment 3 of the present invention when the printer mode is selected.

FIG. 16 is a flow chart of an OC check operation of a digital copying machine according to Embodiment 6 of the present invention when the printer mode is selected.

DESCRIPTION OF THE PREFERRED EMBODIMENTS

Embodiment 1

The following description will explain Embodiment 1 of the present invention with reference to FIGS. 1 to 8, and 23(d). In this embodiment, a digital copying machine is used as a digital image forming apparatus.

(1) Entire Structure of Digital Copying Machine

Figure 1:
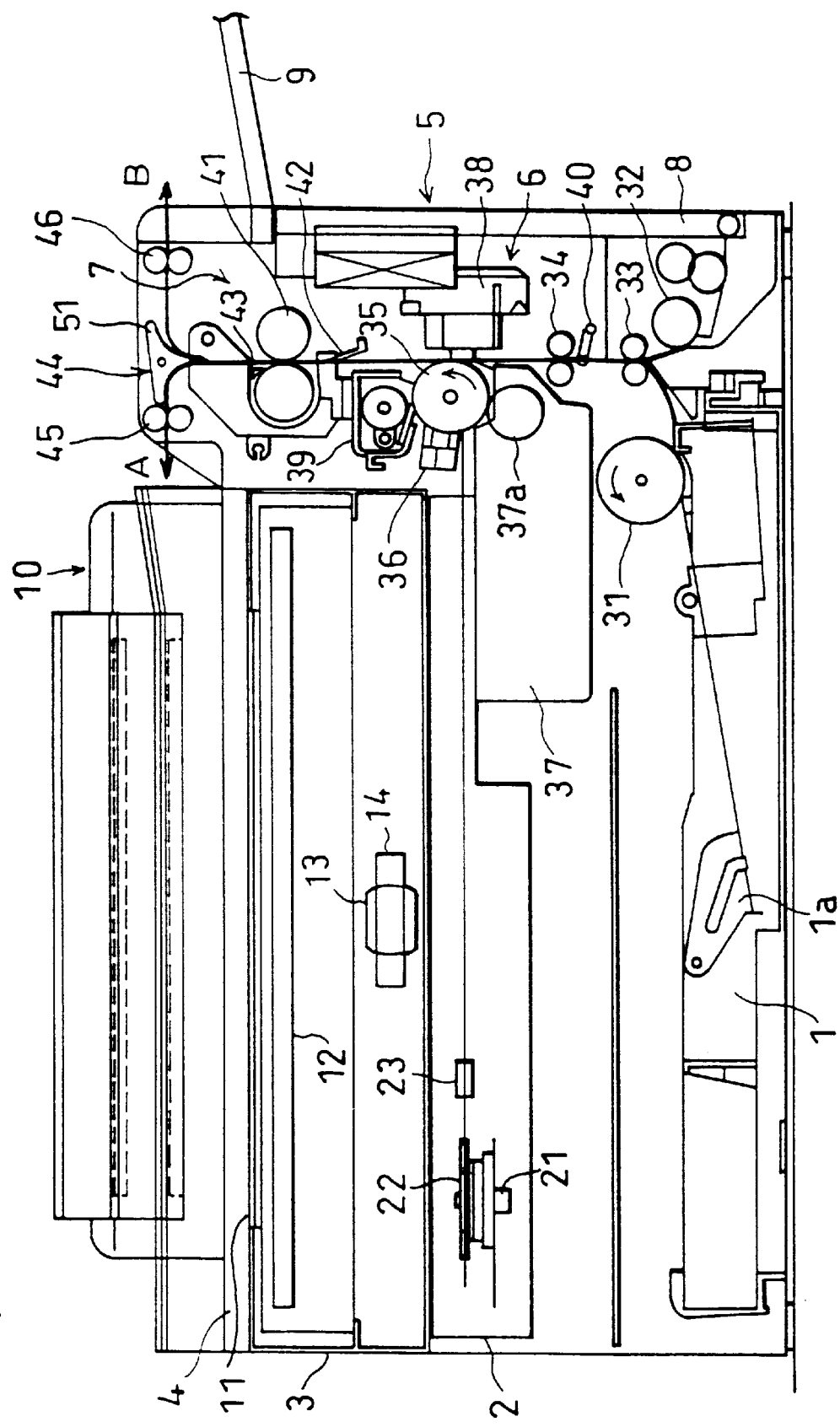
FIG. 1 is a center cross section showing the structure of a digital copying machine according to Embodiment 1 of the present invention.
Figure 23:
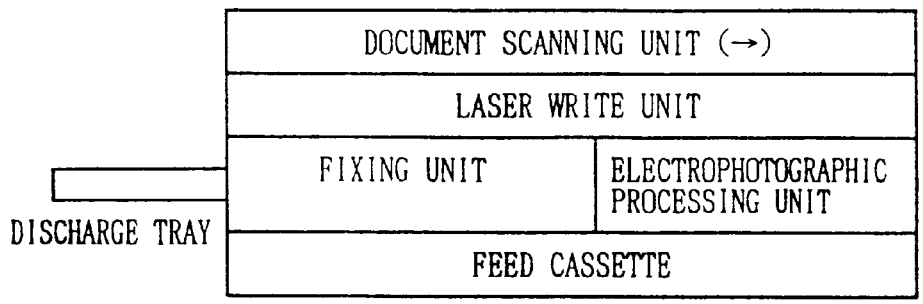
FIG. 23(a) is a depiction showing a schematic structure of a conventional digital copying machine.
FIG. 23(b) is a depiction showing a schematic structure of another conventional digital copying machine.
FIG. 23(c) is a depiction showing a schematic structure of still another conventional digital copying machine.
FIG. 23(d) is a depiction showing a schematic structure of the digital copying machine of FIG. 1.
Figure 23:
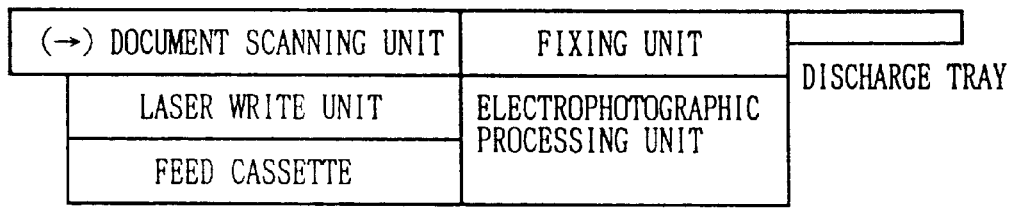
Figure 23:
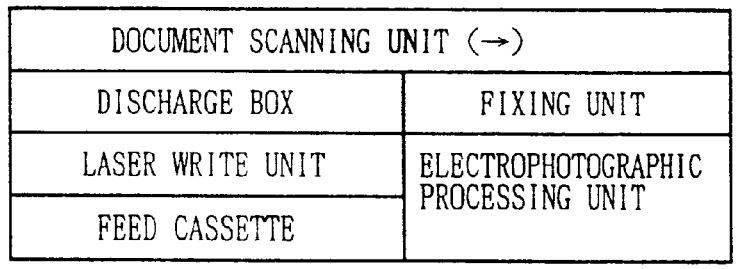
Figure 23:
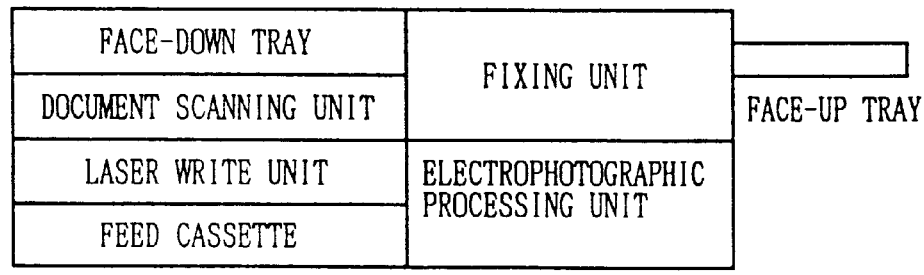

FIG. 1 is a central cross section showing the structure of a digital copying machine. FIG. 23(d) is a depiction showing a schematic structure of the digital copying machine. As illustrated in FIGS. 1 and 23(d), the digital copying machine includes a feed cassette 1, a laser write unit 2, a document scanning unit 3, and an OC cover 4 arranged in this order from the bottom of the main body. A mechanism unit 5 is disposed beside a block of the feed cassette 1, laser write unit 2, document scanning unit 3 and OC cover 4 which are arranged vertically.

Figure 2:
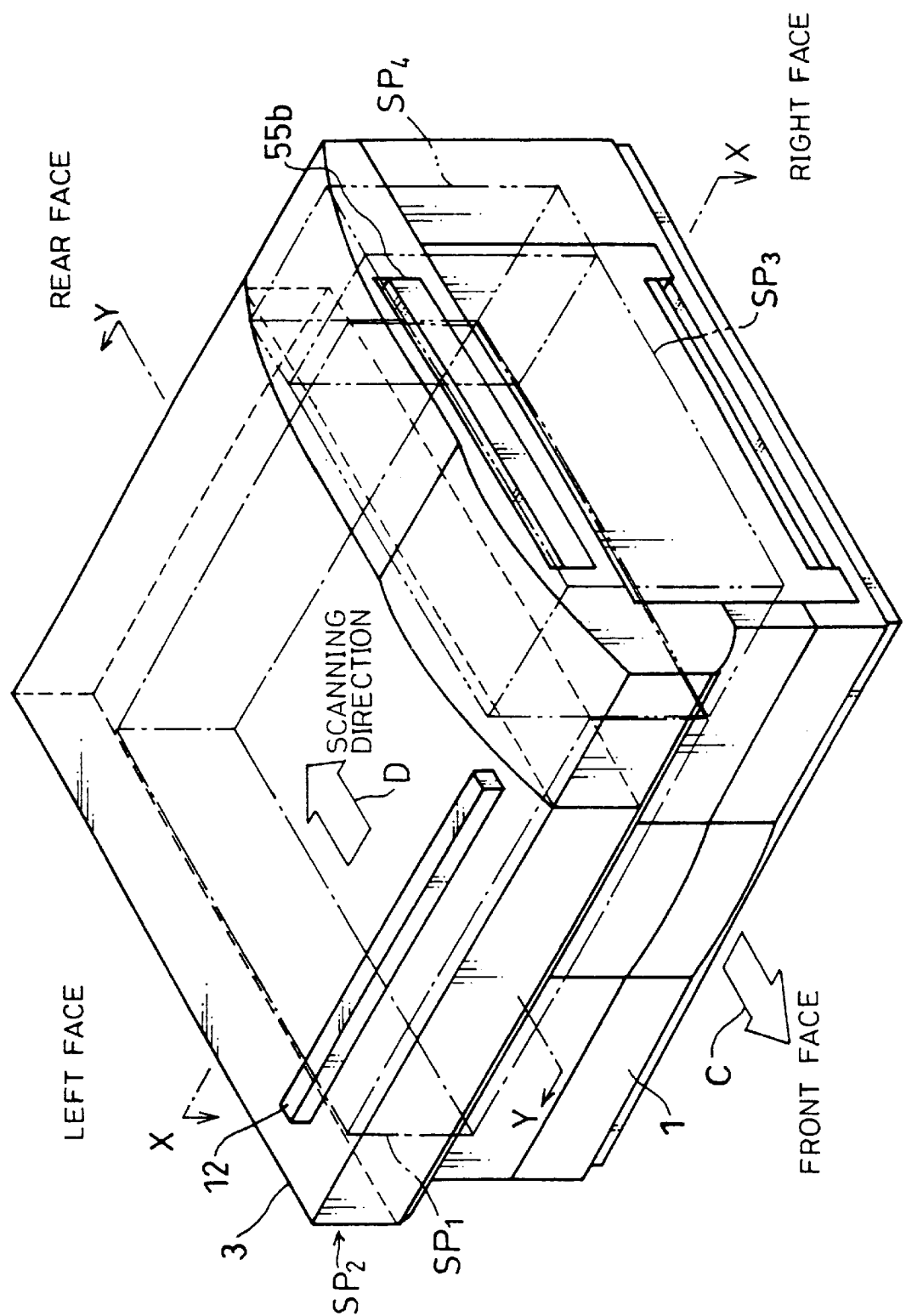
FIG. 2 is a perspective view of the digital copying machine.
Figure 3:
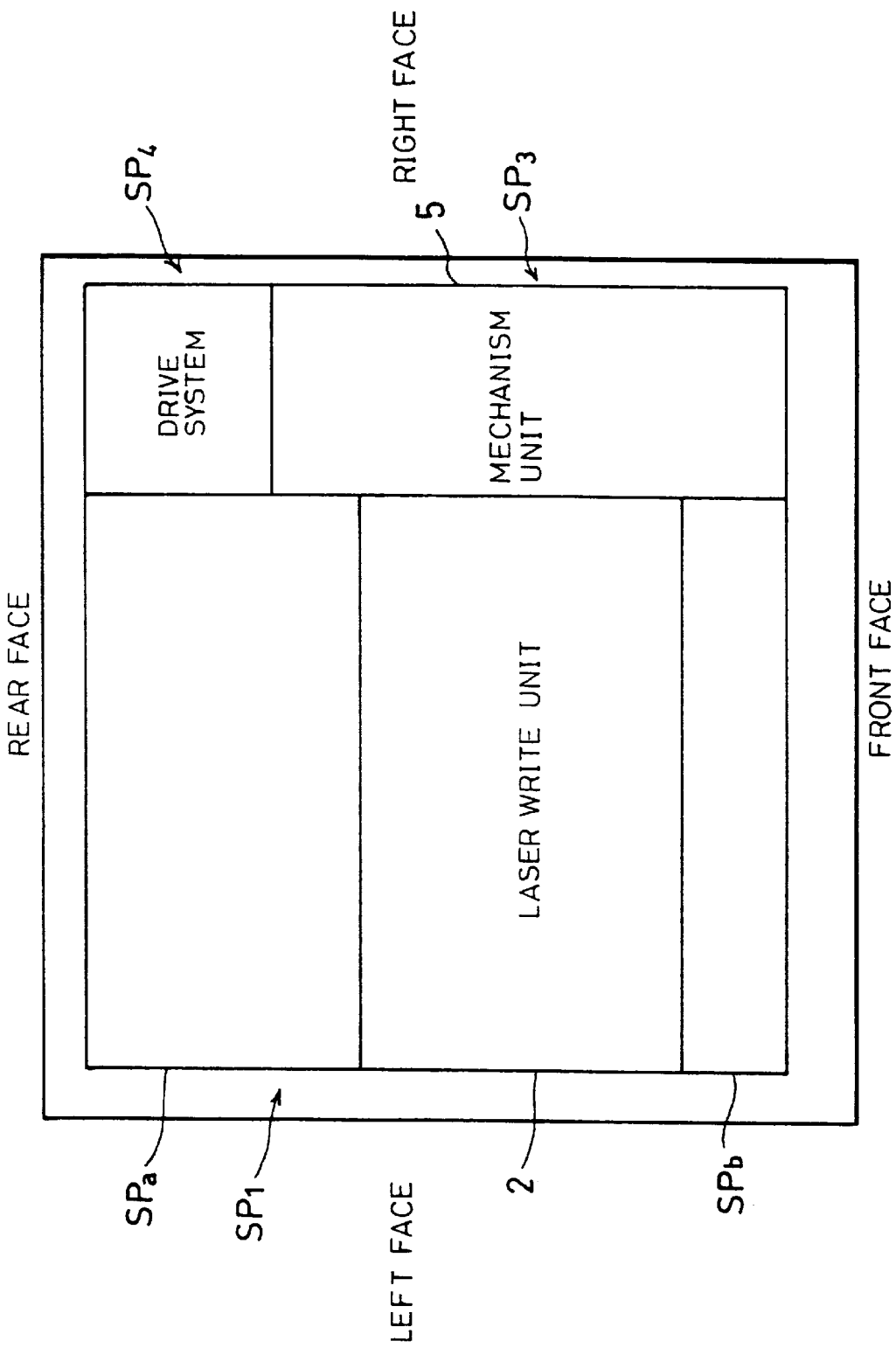
FIG. 3 is an X—X cross section of the digital copying machine of FIG. 2 when space $SP_1$ is cut across a plane parallel to the bottom face of the copying machine main body.
Figure 4:
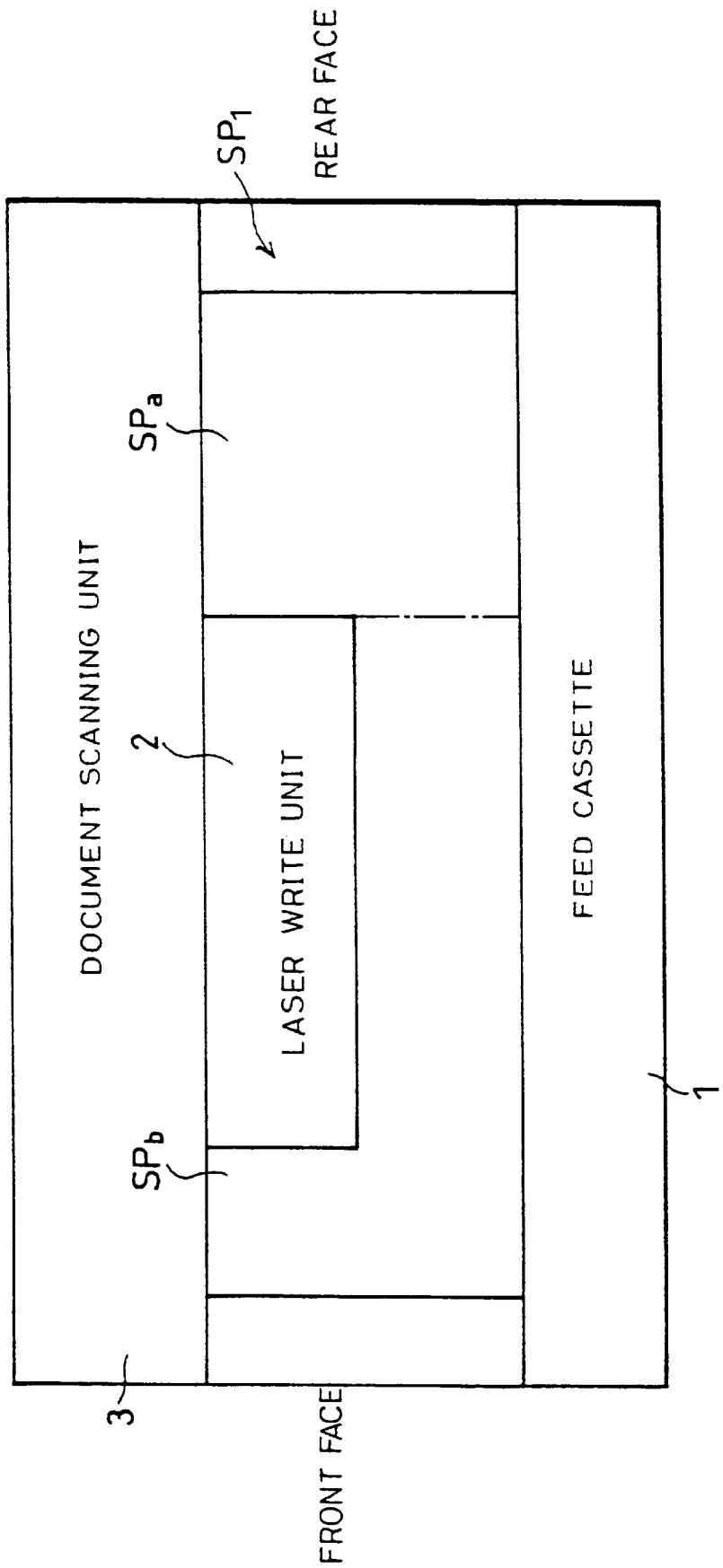
FIG. 4 is a Y—Y cross section of the digital copying machine of FIG. 2 when the digital copying machine main body is vertically cut at around the center thereof.

FIG. 2 is a perspective view of the digital copying machine, but the OC cover 4 is not illustrated in FIG. 2. FIG. 3 is an X—X cross section of the digital copying machine when the space $SP_1$ of the digital copying machine is cut across a plane parallel to the bottom face of the copying machine main body. FIG. 4 is a Y—Y cross section of the digital copying machine when the digital copying machine main body is vertically cut in a middle position of the copying machine main body.

The feed cassette (feed section) 1 stores recording sheets, and feeds the recording sheets to the mechanism unit 5. The feed cassette 1 can be pulled out from the front face of the copying machine main body (in the direction shown by arrow C). The recording sheet is stored in the feed cassette 1 so that a longitudinal direction of the recording sheet is aligned with a direction orthogonal to the pulling direction.

The document scanning unit (document scanning section) 3 is mounted in the space $SP_2$ on the feed cassette 1, and reads the image on a document by scanning the document. At this time, the scanning direction of the document is a direction running from the front face of the copying machine main body toward the rear face (the direction shown by arrow D in FIG. 2). Namely, the scanning direction is parallel, but opposite to the pulling direction of the feed cassette 1. The document is placed on the document scanning unit 3 so that the longitudinal direction of the document is aligned with the scanning direction. In other words, the longitudinal direction of the document placed on the document scanning unit 3 is orthogonal to the longitudinal direction of the recording sheet stored in the feed cassette 1.

The laser write unit (write section) 2 writes an image on a photoreceptor drum 35 according to image data obtained by the document scanning unit 3, or image data transmitted from an external device such as a client's personal computer 64 (see FIG. 6) by the laser light. As shown in FIGS. 3 and 4, the laser write unit 2 is placed on the upper middle section of the space $SP_1$ between the feed cassette 1 and the document scanning unit 3.

The space $SP_1$ includes space $SP_a$ on the rear side. There are a high transformer and a circuit board thereof in the $SP_a$. Moreover, there are a main control circuit board, a copying machine control circuit board, and a print control circuit board in space $SP_b$ that is the area in the space $SP_1$ other than the laser write unit 2 and the space $SP_a$. The copying machine control circuit board activates the mechanism section of each device in the mechanism unit 5. The print control circuit board includes a PC interface 65 (see FIG. 6) so that the print control circuit board can be connected to the client's PC 64.

The mechanism unit (mechanism section) 5 forms a toner image (developer image) according to the image data. As illustrated in FIG. 1, the mechanism unit 5 includes an electrophotographic processing unit 6 for transferring the toner image to the recording sheet from the feed cassette 1 and a fixing unit 7 for fixing the transferred toner image to the recording sheet, and discharges the recording sheet carrying the fixed toner image thereon. The mechanism unit 5 is provided in space $SP_3$ (see FIG. 2).

A driving system is mounted in space $SP_4$ located on the back side of space $SP_3$. The driving system includes a main motor 70 (see FIG. 6) functioning as a drive source for rotating the rollers in the devices of the mechanism unit 5, and a plurality of gears for moving the respective devices in the mechanism unit 5 and the main motor 70.

Figure 6:
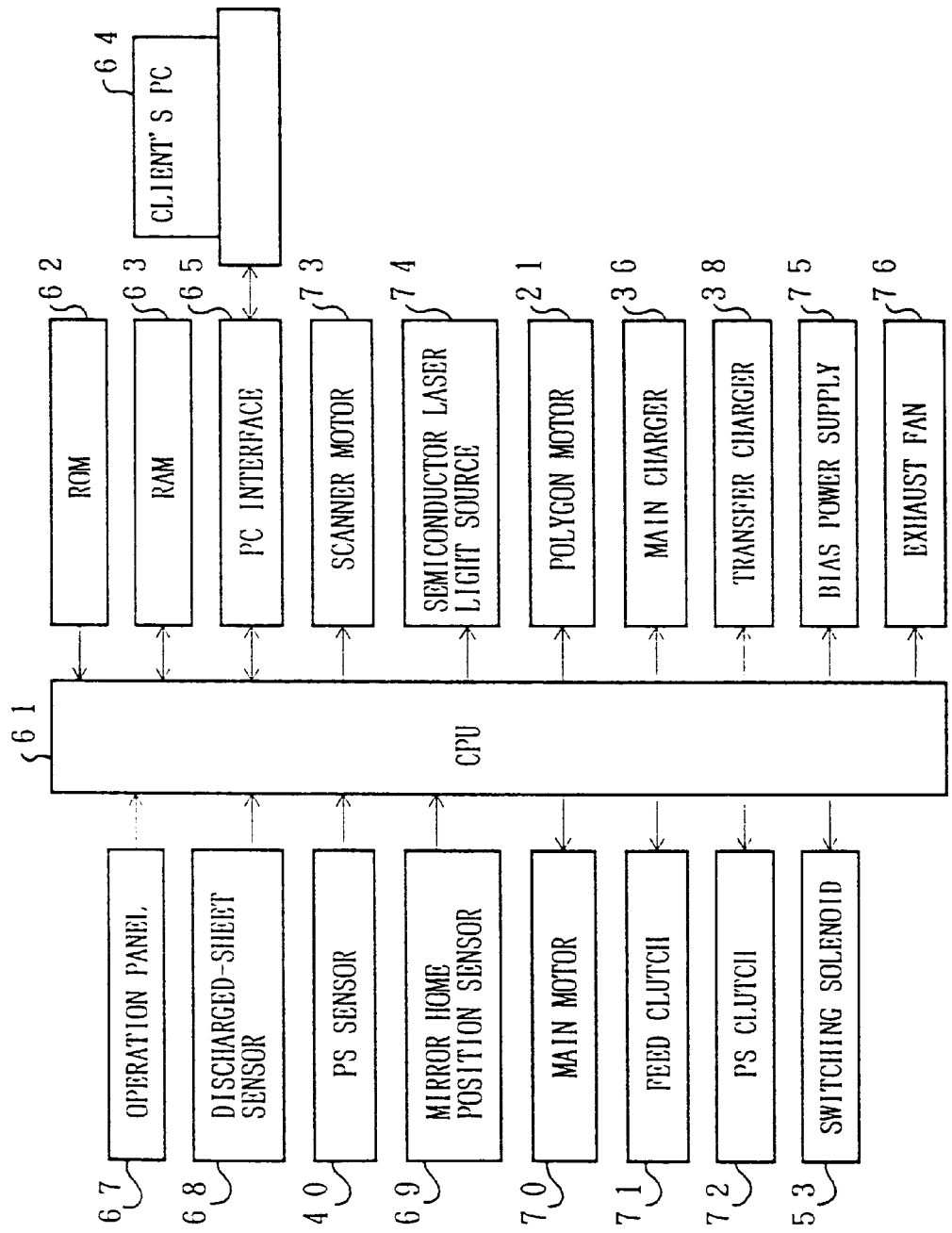
FIG. 6 is a block diagram showing the structure of an electric system of the digital copying machine.

Referring now to FIGS. 1 and 6, the following description will explain the inside structure of each unit.

The document scanning unit 3 includes a table glass 11 upon which the document is to be placed, a lamp unit 12, an optical unit (not shown), an optical lens 13, and a CCD (charge coupled device) 14. The lamp unit 12 includes an exposure lamp for exposing the document surface and a mirror for reflecting a reflected optical image from the document, and moves from the front face of the copying machine main body toward the rear face along the table glass 11. Namely, the scanning direction of the lamp unit 12 is equal to a longitudinal direction of the photoreceptor drum (image carrier) 35 in the electrophotographic processing unit 6. The optical unit guides the reflected light image from the mirror towards the optical lens 13, and moves in the same direction as the lamp unit 12. Moreover, the reflected light image from the document is formed on the CCD 14 through the optical lens 13. The CCD 14 converts the reflected light image from the document into an electric image signal. The lamp unit 12 is driven by a scanner motor 73.

The image data obtained by the document scanning unit 3 is subjected to image processing, and then temporarily stored in a RAM (random access memory) 63. Furthermore, the image data is read out from the RAM 63 upon an output instruction, and output to the laser write unit 2.

The laser write unit 2 includes a semiconductor laser light source 74, a polygon mirror 22, a polygon motor 21, and a f-0 lens 23. The polygon mirror 22 deflects the laser light at an equal angular velocity. The polygon motor 21 drives the polygon mirror 22. The f-0 lens 23 makes a correction so that the laser light deflected at an equal angular velocity is deflected at an equal angular velocity on the photoreceptor drum 35 of the electrophotographic processing unit 6. The semiconductor laser light source 74 emits laser light according to the image data read out from the RAM 63, or the image data transmitted from the external device. An electrostatic latent image is formed by scanning the surface of the photoreceptor drum 35 with the laser light.

The feed cassette 1 has a feed member 1a pushed towards the electrophotographic processing unit 6 by, for example, a spring, and stores the recording sheets on the feed member 1a.

Figure 24:
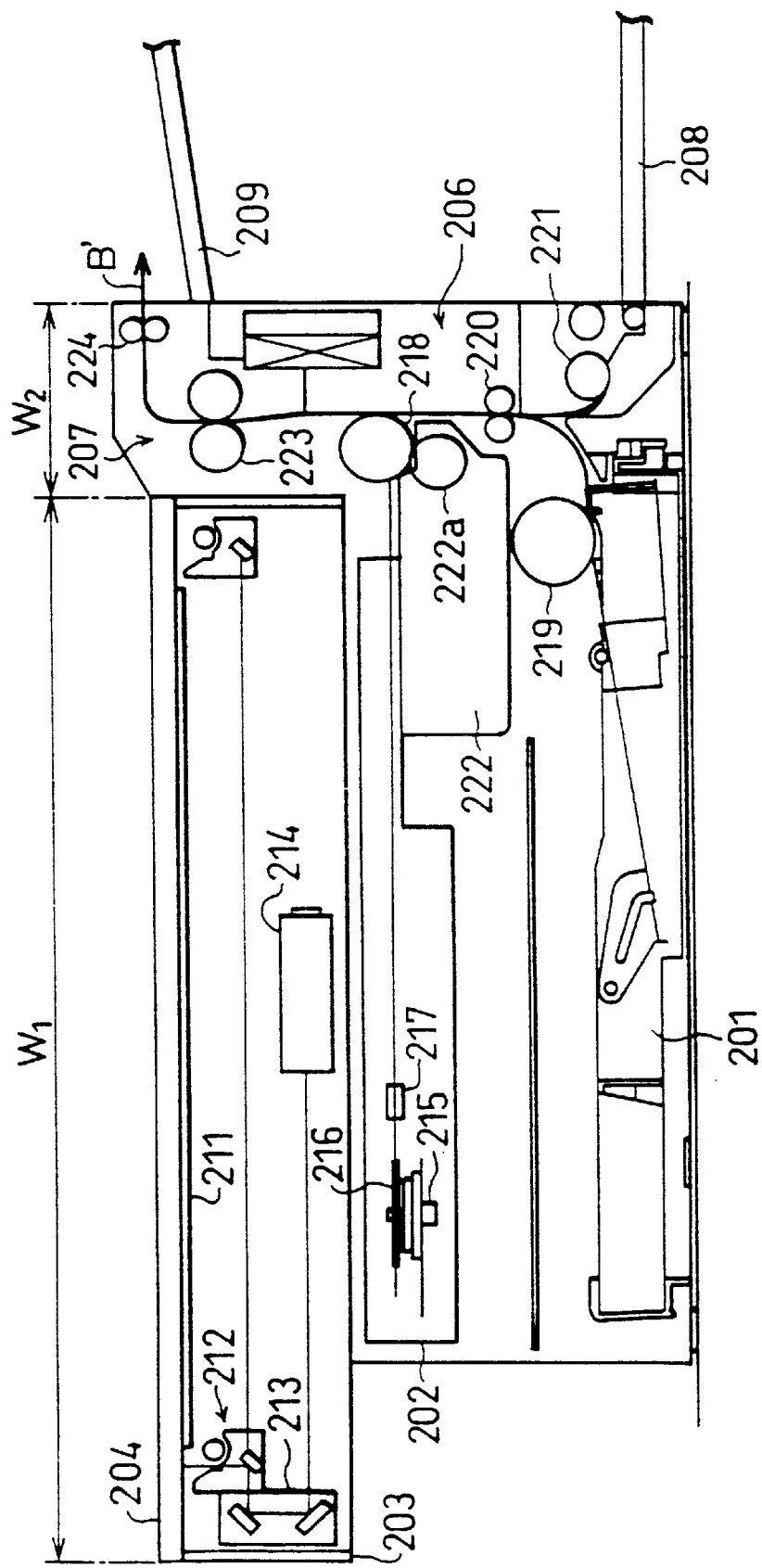
FIG. 24 is a central cross section showing the structure of the digital copying machine of FIG. 23(b).
Figure 25:
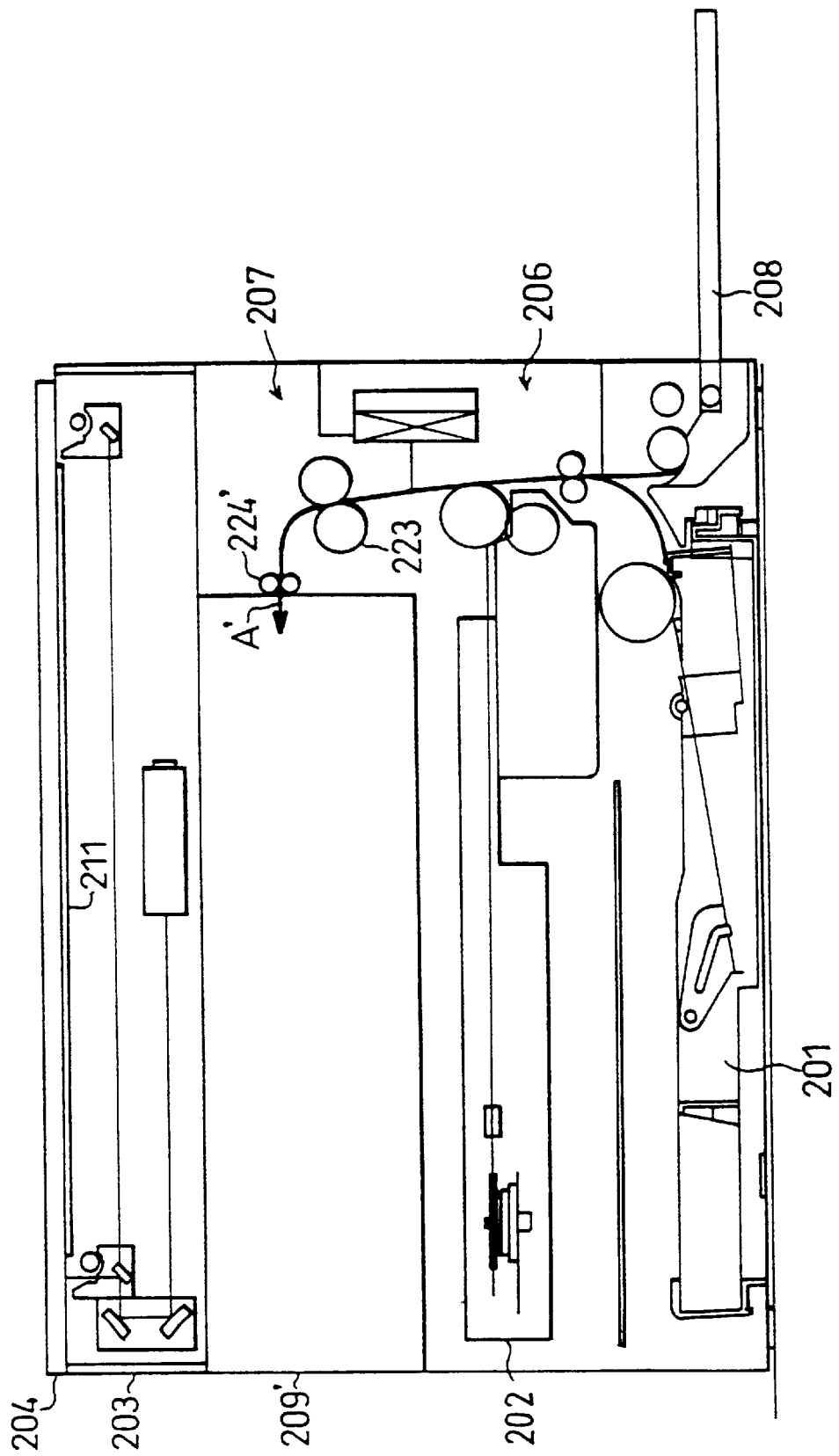
FIG. 25 is a central cross section showing the structure of the digital copying machine of FIG. 23(c).

Disposed in a lower section of the electrophotographic processing unit 6 are a pickup roller 31, a manual-feed roller 32, pre-feed rollers 33, and register rollers 34 (hereinafter referred to as the PS rollers). The pickup roller 31 feeds the recording sheets one sheet at a time from the feed cassette 1. The manual-feed roller 32 transports the recording sheet fed from a folding manual-feed tray 8 mounted on the right side of the copying machine main body. The pre-feed roller 33 transports the recording sheet fed from the pickup roller 31 or the manual-feed roller 32. Disposed on an upstream side of the PS rollers (transport timing adjusting section) 34 is a PS (previous sheet) sensor 40 for detecting the arrival of the recording sheet. In FIG. 1, the manual-feed tray 8 in a folded state is illustrated. When the manual-feed tray 8 is stretched out, it is in a state similar to the manual-feed tray 208 (see FIG. 24) explained in the "Background of the Invention" section.

The topmost recording sheet in the feed cassette 1 is in contact with the pickup roller 31. A piece of the recording sheet is fed to the pre-feed rollers 33 and transported to the PS rollers 34 with a rotation (a counterclockwise rotation in FIG. 1) of the pickup roller 33. Meanwhile, the recording sheet fed from the manual-feed tray 8 is fed one sheet at a time to the pre-feed rollers 33 by the manual-feed roller 32, and transported to the PS rollers 34.

A main charger 36, a developing device 37, a transfer charger 38, and a cleaning device 39 are arranged in this order around the photoreceptor drum 35 of the electrophotographic processing unit 6.

The main charger 36 includes a grid electrode to which a high voltage is applied, and charges the photoreceptor drum 35. The developing device 37 includes a developing roller 37a mounted in contact with the surface of the photoreceptor drum 35. The developing device 37 forms a toner image on the photoreceptor drum 35 according to the electrostatic latent image formed on the surface of the photoreceptor 35. The transfer charger 38 transfers the toner image to the recording sheet. The cleaning device 39 collects the toner remaining on the transfer drum 35 after the transfer of the toner image. At this time, a bias voltage is applied between the transfer charger 38 and the photoreceptor drum 35 by a bias power supply 75.

The fixing unit 7 includes fixing rollers 41, a fixing guide 42, and a separating claw 43. The fixing rollers 41 fuse the toner image onto the recording sheet by applying heat of a predetermined temperature and predetermined pressure. The fixing guide 42 is disposed on the upstream side of the fixing rollers 41, and guides the recording sheet to the fixing rollers 41 after the transfer of the toner image. The separating claw 43 separates the recording sheet from the fixing rollers 41 after the fixing operation.

Moreover, disposed on the downstream side of the fixing rollers 41 are a discharge-opening switching section 44 for switching the transport paths of the recording sheet, discharge rollers 45, and discharge rollers 46. The discharge rollers 45 discharge the recording sheet toward a face-down tray 10 (the direction shown by arrow A in FIG. 1) through the discharge-opening switching section 44. The discharge rollers 46 discharge the recording sheet toward a face-up tray 9 (the direction shown by arrow B in FIG. 1) through the discharge-opening switching section 44.

The face-down tray (first discharge section) 10 is mounted on the upper face of the OC cover (document cover) 4. The face-down tray 10 is a small-capacity tray that is used in a printer mode in which the recording sheet is discharged with its image-recorded side facing down and the image data from the external device is recorded.

The face-up tray (second discharging section) 9 is mounted on a side of the apparatus opposite to the face-down tray 10 with the fixing unit 7 therebetween. The face-up tray 9 is a large-capacity tray whose capacity is larger than the face-down tray 10. The face-up tray 9 is used in a copy mode in which the recording sheet is basically discharged with its image-recorded side facing up and the image data of the document is recorded.

According to the structure of the mechanism unit 5, the pre-feed rollers 33, PS rollers 34, photoreceptor drum 35, and fixing rollers 41 are substantially vertically arranged in this order. In this case, since the fixing unit 7 having the fixing rollers 41 is located on the topmost stage, it is possible to release heat generated from the fixing unit 7 in an upward direction of the copying machine main body. It is thus possible to shorten the distance between the fixing unit 7 and the electrophotographic processing unit 6. Moreover, since the laser write unit 2 and the control substrate which are easily affected by heat can be positioned away from the fixing unit 7, it is not necessary to provide parts, such as a heat dealing part (cooling fan) for cooling down the semiconductor laser light source section 74 in the laser write unit 2.

(2) Structure of Discharge-Opening Switching Section

Figure 5:
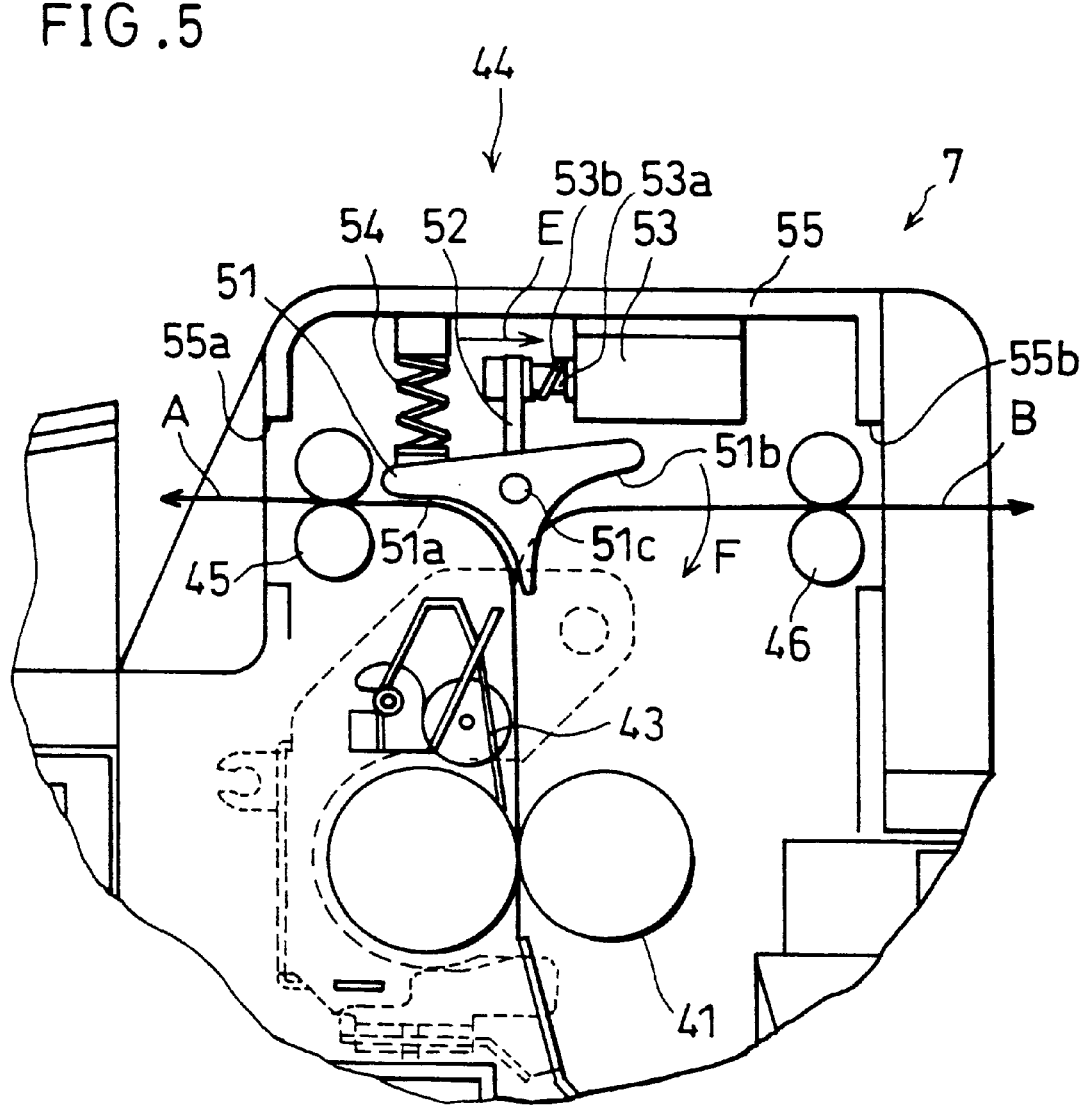
FIG. 5 is a front view showing an area around a discharge-opening switching section of the digital copying machine.

FIG. 5 is a front view showing an area around the discharge-opening switching section 44 of the digital copying machine. The discharge-opening switching section 44 includes a transport-path switching plate 51, an arm 52, a switching solenoid 53, and a switching spring 54.

The transport-path switching plate 51 is fixed to the arm 52 with a boss 51c, and includes a guide face 51a for guiding the recording sheet in the direction shown by arrow A and a guide face 51b for guiding the recording sheet in the direction shown by arrow B. There is a core 53a connected to the arm 52 in the center section of the switching solenoid 53. A spring 53b is wound on the core 53a. The switching spring 54 is mounted on the upper face of the transport switching plate 51 on a side adjacent to the discharge rollers 45.

The switching solenoid 53 and switching spring 54 are fixed to the inner face of an external wall 55 of the fixing unit 7. The external wall 55 has a discharge opening 55a formed in a side adjacent to the discharge rollers 45, and a discharge opening 55b formed in a side near the discharge rollers 46. The discharge opening 55a is provided for the discharge of the recording sheet toward the face-down tray 10, while the discharging opening 55b is formed for the discharge of the recording sheet toward the face-up tray 9.

In this structure, when the printer mode is selected, the switching solenoid 53 is turned off. In this state, as shown in FIG. 5, the spring 53b and switching spring 54 are stretched, and the recording sheet is discharged toward the discharge opening 55a along the guide face 51a.

On the other hand, when the copy mode is selected, the switching solenoid 53 is turned on. At this time, the core 53a is sucked into the inside of the switching solenoid 53, and the arm 52 moves in the direction shown by arrow E that is parallel to the direction of arrow B. As a result, the transport-path switching plate 51 turns in the direction shown by arrow F round the connecting point with the core 53a, and therefore the recording sheet is discharged toward the discharge opening 55b along the guide face 51b. At this time, the spring 53b is pushed toward the arm 52, and the switching spring 54 is pushed downward. In this case, when the switching solenoid 53 is turned off, the discharge-opening switching section 44 returns to the state in the printer mode.

(3) Digital Copying Machine's Electric System Structure

FIG. 6 shows a block diagram showing the structure of the electric system of the above-mentioned digital copying machine. The digital copying machine includes a CPU (central processing unit) 61 mounted on the main control circuit board. The CPU 61 is connected to a ROM (read only memory) 62 for storing programs for operating the digital copying machine, and the RAM 63 for processing and storing the operation conditions and image data. A print request and image data from the client's PC 64 as an external device are input to the CPU 61 through the PC interface 65.

An operation panel 67 is provided on the upper face of the copying machine main body. The operation panel 67 includes a liquid crystal display device for displaying the operation conditions and switches such as a print switch, and is controlled by the CPU 61.

A discharged-sheet sensor 68 is provided in the vicinity of the discharge opening 55b for the face-up tray 9, and in the vicinity of the discharge opening 55a for the face-down tray 10. The discharged-sheet sensor 68 detects whether the recording sheet is present at the discharge opening 55a or 55b, and inputs a discharged-sheet detection signal to the CPU 61 when the recording sheet is passing through the discharge opening 55a or 55b.

As described above, the PS sensor 40 detects the presence of the recording sheet on the upstream side of the PS roller 34, and inputs a sheet detection signal to the CPU 61 when the recording sheet reaches the upstream side of the PS roller 34.

A mirror home position sensor 69 detects the home position of the polygon mirror 22, and inputs a mirror home position detection signal to the CPU 61 when the polygon mirror 22 is in the mirror home position.

A feed clutch 71 is connected to the pickup roller 31. When the feed clutch 71 is turned on, the pickup roller 31 rotates to perform a feeding operation. A PS clutch 72 is connected to the PS roller 34. When the PS clutch 72 is turned on, the PS roller 34 rotates. An exhaust fan 76 discharges the heat in the digital copying machine to the outside.

The CPU 61 controls the main motor 70, feed clutch 71, PS clutch 72, switching solenoid 53, scanner motor 73, semiconductor laser light source 74, polygon motor 21, main charger 36, transfer charger 38, and bias power supply 75 according to the input discharged-sheet detection signal, sheet detection signal or mirror home position detection signal.

(4) Operation in Copy Mode

Next, the following description will explain an operation performed when the digital copying machine is used in the copy mode in which the image data obtained by the document scanning unit 3 is copied to the recording sheet.

Figure 7:
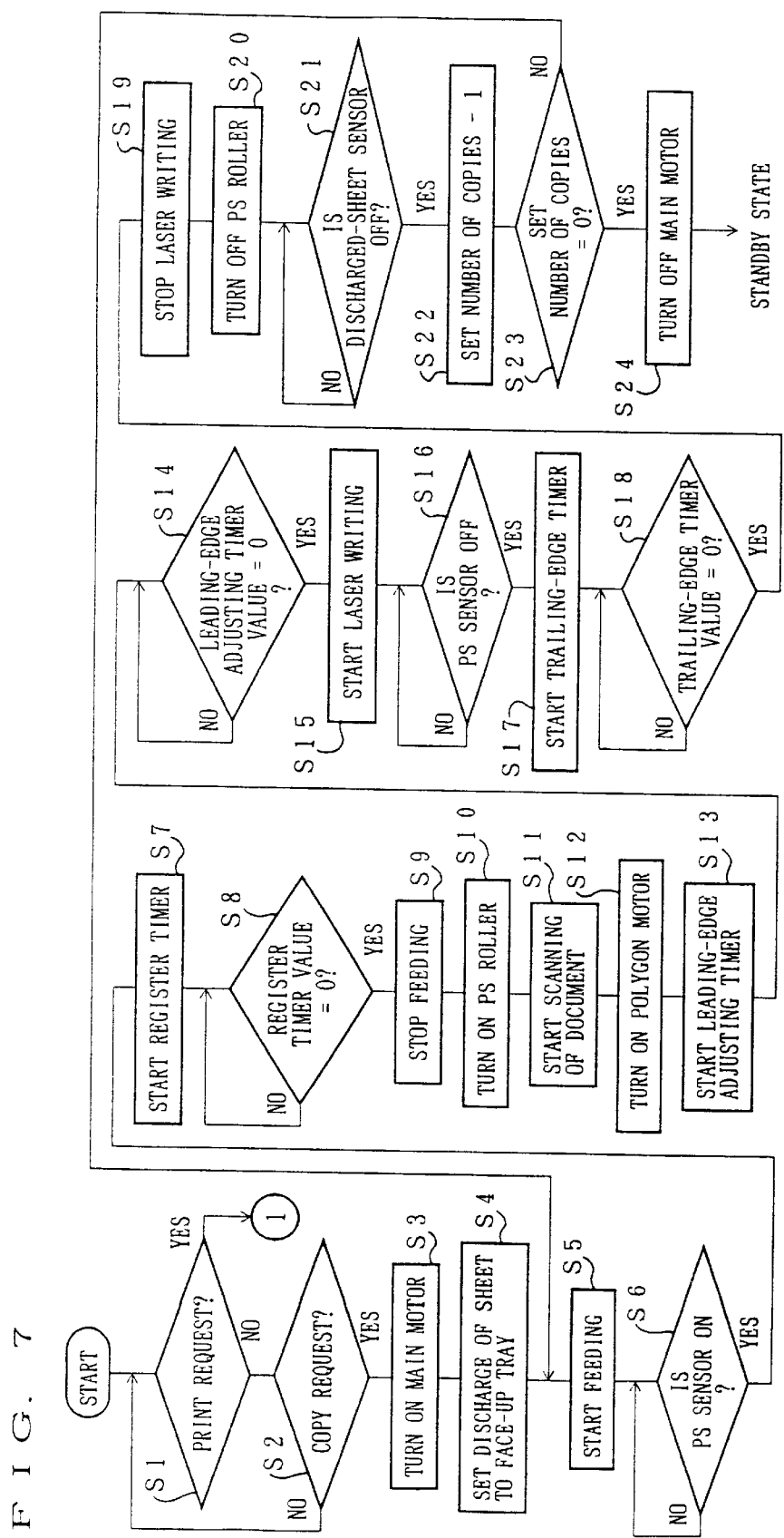
FIG. 7 is a flow chart of an operation of the digital copying machine when a copy mode is selected.

As illustrated in FIG. 7, the digital copying machine in a standby state waits for a print request or a copy request (step S1 or S2). When copying is requested in S2, the main motor 70 is turned on (S3), and a setting for discharging the recording sheet to the large-capacity face-up tray 9 is made (S4). Then, the feed clutch 71 is turned on, and the pickup roller 31 is rotated to start a feeding operation (S5).

The digital copying machine waits until the PS sensor 40 is turned on (S6). The turning on of the PS sensor 40 triggers a register timer in which a registration time has been set (S7). When the value of the register timer becomes zero, there is no need to wait for the registration time (S8). Then, the feeding operation is stopped (S9), and the PS clutch 72 is turned on to rotate the PS roller 34 (S10). Subsequently, the scanner motor 73 is turned on to start the scanning of the document (S11).

Thereafter, the digital copying machine causes the semiconductor laser light source 74 to emit laser light according to the image data read out from the RAM 63, and turns on the polygon motor 21 (S12). Next, a leading-edge adjusting timer in which the time required for the leading edge of the recording sheet to reach the laser write position has been set is started (S13). When the value of the leading-edge adjusting timer becomes zero and the leading edge is placed in position (S14), the laser write operation is started by activating the main charger 36 and transfer charger 38 and turning on the bias power supply 75 (S15).

The digital copying machine waits until the PS (previous sheet) sensor is turned off (S16), and starts a trailing-edge timer in which the time required for the trailing edge of the recording sheet reaches the laser write position has been set (S17). When the value of the trailing-edge timer becomes zero and the trailing edge of the recording sheet is recognized (S18), the laser write operation is stopped (S19), and the rotation of the PS roller 34 is stopped by turning off the PS clutch 72 (S20).

When the discharged-sheet sensor 68 is turned off (S21), the copying processing of a piece of the recording sheet has been completed, and therefore the digital copying machine subtracts one from the set (desired) number of copies to be produced (S22). After the substraction in S22, it is judged whether the set number of copies becomes zero (S23). If the set number of copies is zero, the copying processing has been completed. Therefore, the main motor 70 is turned off (S24), and the digital copying machines returns to the standby state. On the other hand, if the set number of copies is not zero, the copying processing has not been completed. At this time, the digital copying machine returns to S5 and resumes the feeding operation.

(5) Operation in Printer Mode

Next, the following description will explain the operation of the digital copying machine in the printer mode in which the image data from the client's PC 64 is printed on the recording sheet.

Figure 8:
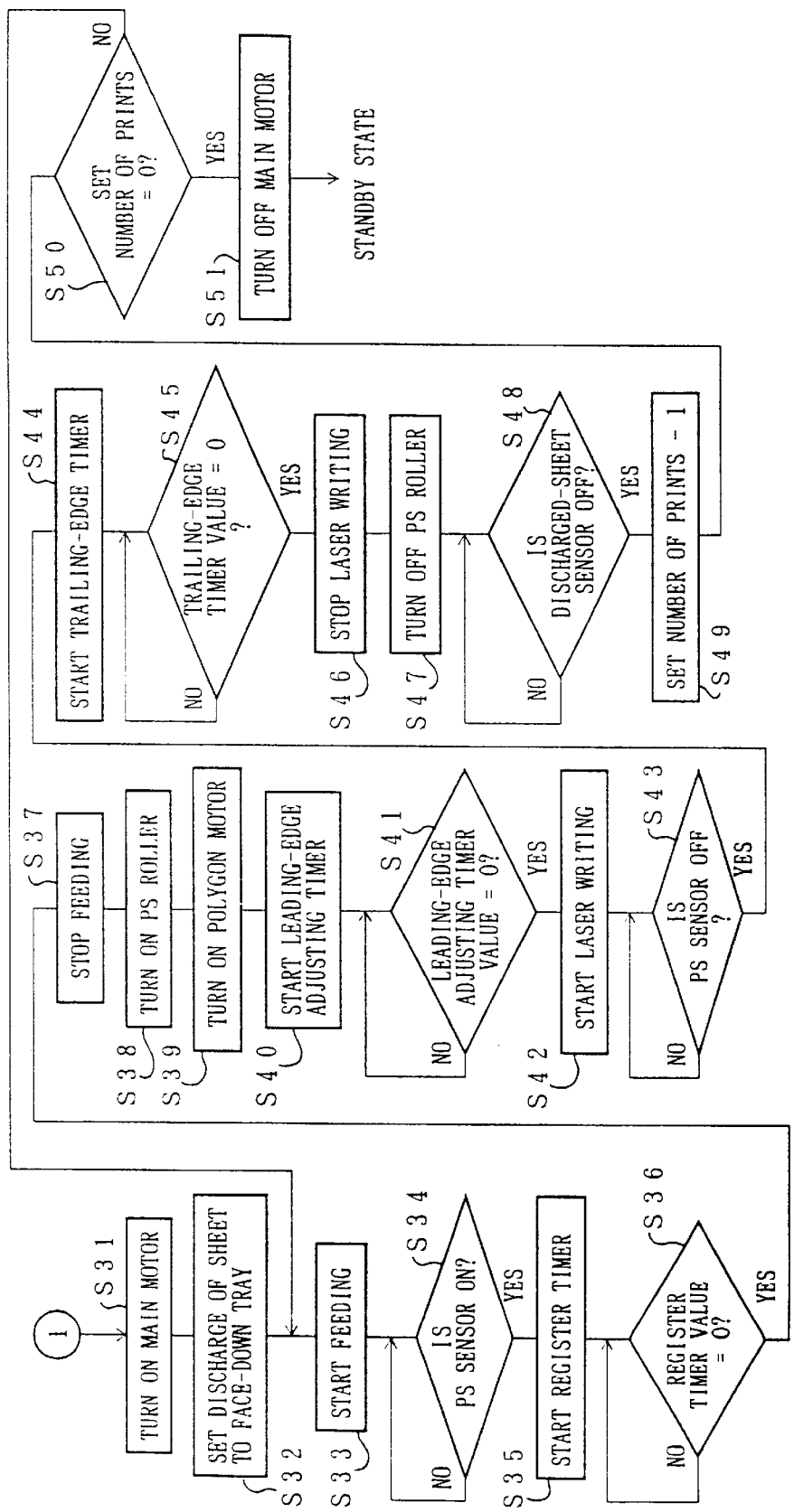
FIG. 8 is a flow chart of an operation of the digital copying machine when a printer mode is selected.

When printing is requested in S1, as shown in FIG. 8, the digital copying machine turns on the main motor 70 (S31), and arranges the recording sheet to be discharged to the small-capacity face-down tray 10 (S32). Then, the feeding operation is started by turning on the feed clutch 71 and rotating the pickup roller 31 (S33).

Thereafter, the same operations as in the above-mentioned copy mode (S6 to S10 and S12 to S20) are performed until the PS roller 34 is stopped (S34 to S47), except for the scanning of the document. More specifically, the digital copying machine waits until the PS sensor 40 is turned on (S34). The turning on of the PS sensor 40 triggers the register timer (S35). When the value of the resister timer becomes zero, there is no need to wait for registration (S36). Accordingly, the feeding operation is stopped (S37), and the PS roller 34 is rotated by turning on the PS clutch 72 (S38).

Subsequently, the digital copying machine causes the semiconductor laser light source 74 to emit laser light according to image data read out from the RAM 63, and turns on the polygon motor 21 (S39). Next, the leading-edge adjusting timer is started (S40). When the value of the leading edge timer becomes zero and the leading edge is placed in position (S41), the main charger 36 and the transfer charger 38 are activated, and the laser write operation is started by turning on the bias power supply 75 (S42).

The digital copying machine waits until the PS sensor 40 is turned off (S43). The turning off of the PS sensor 40 triggers the trailing-edge timer (S44). When the value of the trailing-edge timer becomes zero and the trailing edge of the recording sheet is recognized (S45), the laser write operation is stopped (S46), and the rotation of the PS roller 34 is stopped by turning off the PS clutch 72 (S47).

When the discharged-sheet sensor 68 is turned off (S48), the printing processing of a piece of the recording sheet has been completed, and therefore the digital copying machine subtracts one from the set number of prints to be produced (S49). After the substraction in S49, it is judged whether the set number of prints becomes zero (S50). If the set number of prints is zero and the printing processing has been completed, the main motor 70 is turned off (S51) and the digital copying machines returns to the standby state. On the other hand, if the set number of prints is not zero and the printing processing has not been completed, the digital copying machine returns to S33 and resumes the feeding operation.

As described above, the digital copying machine of this embodiment includes the feed cassette 1 for feeding the recording sheet, the document scanning unit 3 for reading the image on a document by scanning the document, the laser write unit 2, positioned between the feed cassette 1 and document scanning unit 3, for writing the image data of the document or image data from an external device, and the mechanism unit 5 for forming a toner image according to the image data, and transferring and fixing the toner image to the recording sheet from the feed cassette 1, the mechanism unit 5 being disposed beside a block of the feed cassette 1, laser write unit 2 and document scanning unit 3 which are arranged vertically.

In this structure, the scanning direction of the document by the lamp unit 12 of the document scanning unit 3 is equal to a longitudinal direction of the photoreceptor drum 35 of the mechanism unit 5. Moreover, a longitudinal direction of the document placed on the table glass 1 of the document scanning unit 3 and a longitudinal direction of the recording sheet stored in the feed cassette 1 cross each other at a right angle.

Here, since the mechanism unit 5 is positioned beside the block of the feed cassette 1, laser write unit 2 and document scanning unit 3 which are arranged vertically, it has an L-shaped transport path. Therefore, the width of the digital copying machine when seen from the front face of the copying machine main body varies depending on the widths of the document scanning unit 3 and mechanism unit 5.

In general, the length of the document scanning unit 3 in the scanning direction (the longitudinal direction of the document) is longer than the length thereof in a direction orthogonal to the scanning direction. In this embodiment, since the scanning direction of the document by the lamp unit 12 is equal to a longitudinal direction of the photoreceptor drum 35, the longitudinal direction of the document scanning unit 3 is the same as the longitudinal direction of the photoreceptor drum 35. In other words, a transverse direction of the document scanning unit 3 (i.e., a direction along the shorter side of the document scanning unit 3) coincides with the longitudinal direction of the recording sheet.

With this structure, it is possible to reduce the width of the digital copying machine without reducing the effect of decreasing the height from the feed cassette 1 to the document scanning unit 3 produced by the L-shaped transport path. As a result, the size of the digital copying machine is reduced, and the user can easily handle the digital copying machine.

Moreover, the above-mentioned digital copying machine includes the face-down tray 10 mounted on the OC cover 4 above the document scanning unit 3, the face-up tray 9 provided on a side of the apparatus opposite to the face-down tray 10 with respect to the mechanism unit 5, and the discharge-opening switching section 44 for discharging the recording sheet to the face-down tray 10 in the printer mode and discharging the recording sheet to the face-up tray 9 in the copy mode.

With this structure, since the discharge operation according to the operation modes, namely the printer mode and copy mode, is achieved, the user can easily handle the digital copying machine.

In general, the amount of the recording sheets discharged to the discharge tray is less in the printer mode than in the copy mode. It is therefore possible to decrease the height of the face-down tray 10 placed above the document scanning unit 3.

Additionally, in the printer mode, the image data are transmitted from the first page by an external device. However, in the printer mode, since the recording sheets are discharged with their image-recorded side facing down, a set of prints obtained are arranged in the proper page order, i.e., the page order of the prints is not reversed. On the other hand, in the copy mode, since the recording sheets are discharged with their image-recorded side facing up, it is possible to immediately confirm the printed state of the copies produced. Thus, the user can easily handle this digital copying machine.

Embodiment 2

Figure 9:
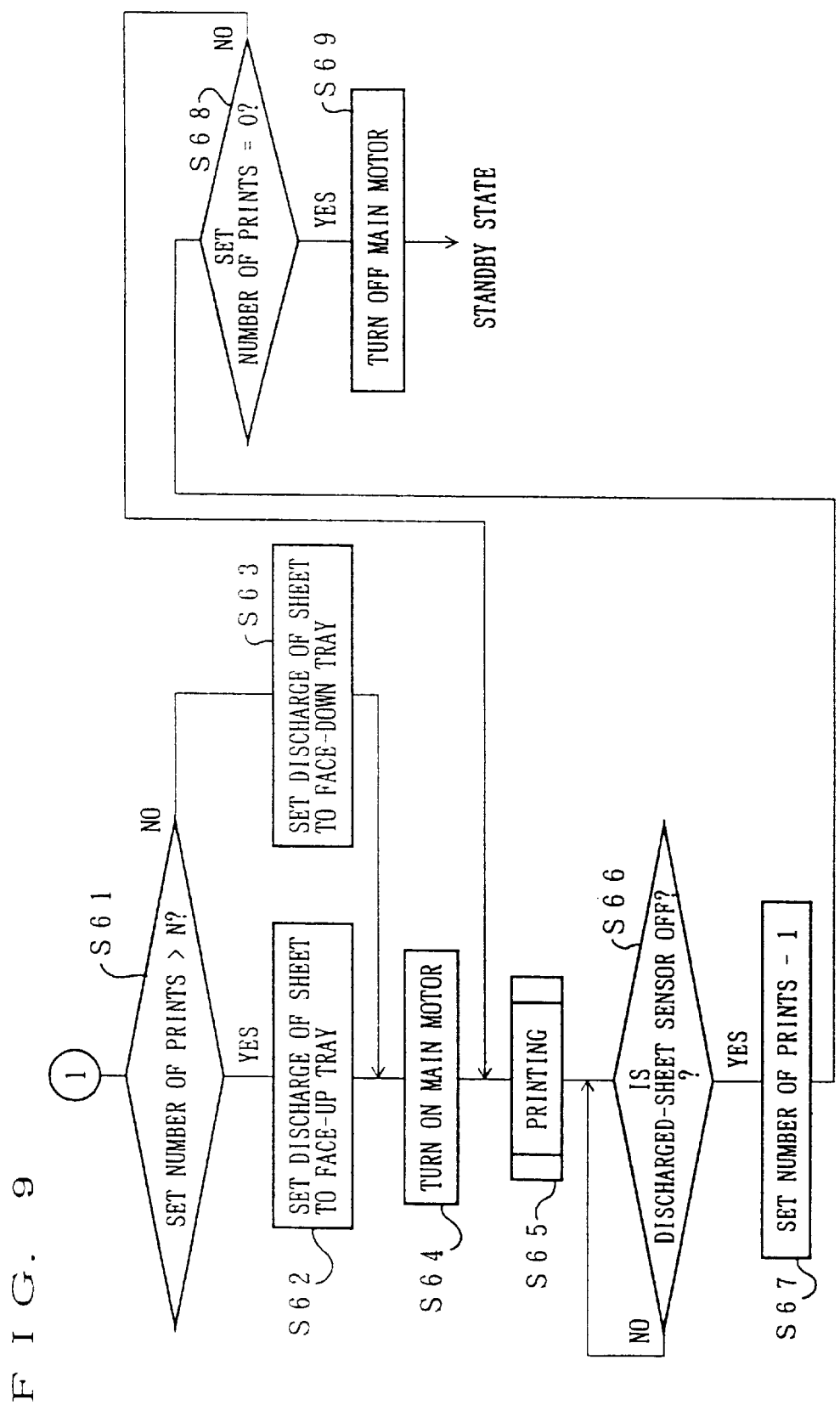
FIG. 9 is a flow chart of a switching operation of a digital copying machine according to Embodiment 2 of the present invention when the printer mode is selected.

The following description will explain Embodiment 2 of the present invention with reference to FIG. 9. For the sake of convenience of explanation, the same members as those shown in the figures of the above-mentioned embodiment will be designated with the same codes, and the explanation thereof will be omitted.

When a plurality of personal computers are connected with a net work, a print request that exceeds the capacity of the face-down tray 10 is sometimes input to the digital copying machine. In this case, if all of the recording sheets are discharged to the face-down tray 10, a jam occurs.

In order to prevent such a problem, in a digital copying machine of this embodiment, when the desired (set) number of prints exceeds a maximum capacity N of the small-capacity face-down tray 10, the recording sheets are discharged to the large-capacity face-up tray 9 from the begging of the printing operation.

The CPU 61 of the digital copying machine includes a volume judging section for judging whether the set number of prints is greater than the maximum capacity N of the face-down tray 10 whenever a print request is made. The CPU 61 switches the position of the transport switching plate 51 in the discharge-opening switching section 44 to either the face-up tray 9 side or the face-down tray 10 side according to the judgement.

Referring now to FIG. 9, the following description will explain the operation of the digital copying machine.

When a print request is made in S1 (see FIG. 7), the digital copying machine judges whether the set number of prints exceeds the maximum capacity N of the face-down tray 10 by the volume judging section (S61). In S61, if the set number of prints is greater than N, the digital copying machine is arranged to discharge the recording sheets to the face-up tray 9 (S62). On the other hand, in S61, if the set number of prints is equal to or less than N, a normal setting for discharging the recording sheets to the face-down tray 10 is made (S63). Then, the main motor 70 is turned on (S64), and the printing operation is performed according to the steps S33 to S47 shown in FIG. 8 (S65).

When the discharged-sheet sensor 68 is turned off (S66), the printing processing of a piece of the recording sheet is completed, and therefore one is subtracted from the set number of prints (S67). After the subtraction in S67, it is judged whether the set number of prints becomes zero (S68). If the set number of prints is zero, the copying processing has been completed. Therefore, the main motor 70 is turned off (S69), and the digital copying machine returns to the standby state. On the other hand, if the set number of prints is not zero in S68, the copying processing has not been completed. In this case, the digital copying machine returns to S65 and continues the printing operation.

As described above, the digital copying machine of this embodiment includes the face-down tray 10 whose capacity is smaller than the capacity of the face-up tray 9, and the volume judging section for judging the amount of the recording sheets to be processed in the printer mode. When a print request that exceeds the capacity of the face-down tray 10 is made, the discharge-opening switching section 44 switches the discharge direction of the recording sheet to the discharge opening for the face-up tray 9 from the discharge opening for the face-down tray 10, and all of the recording sheets are discharged to the face-up tray 9 from the beginning of the printing operation.

With this structure, even when a plurality of personal computers are connected with a network and a print request exceeding the capacity of the face-down tray 10 is made, it is possible to prevent a jam from occurring in the face-down tray 10 because all of the recording sheets are discharged to the face-up tray 9.

In the digital copying machine of Embodiment 2, before discharging the recording sheets to the face-up tray 9, i.e., when the setting for discharging the recording sheets to the face-up tray 9 is made, it is possible to store all of the image data from the external device temporarily in the RAM (memory section) 63, and perform the printing processing from the last page of the image data.

With this structure, all of the image data are temporarily stored in the RAM 63, and then the printing processing is performed from the last page of the image data. Therefore, the recording sheets are discharged from the last page with their image-recorded side facing up to the face-up tray 9. In this case, the page order of a set of prints produced is not reversed, and the printed side faces up. Thus, the printed state can be immediately confirmed, and the user can easily handle the digital copying machine.

Embodiment 3

The following description will explain Embodiment 3 of the present invention with reference to FIG. 10. For the sake of convenience of explanation, the same members as those shown in the figures of the above-mentioned embodiments will be designated with the same codes, and the explanation thereof will be omitted.

In a digital copying machine of this embodiment, when the number of the recording sheets subjected to the printing processing exceeds the maximum capacity N of the small capacity face-down tray 10, the discharge direction is switched to the face-up tray 9 during printing, and the recording sheets are discharged to the face-up tray 9.

The CPU 61 of the digital copying machine includes a discharged-sheet counter for counting the number of the recording sheets discharged to the face-down tray 10. Moreover, the CPU 61 judges whether the number of the discharged sheets is greater than the maximum capacity N of the face-down tray 10 according to the count information of the discharged-sheet counter. When the number of the discharged sheets exceeds N, the CPU 61 switches the position of the transport switching plate 51 in the discharge-opening switching section 44 to the face-up tray 9 side from the face-down tray 10 side.

Referring now to FIG. 10, the following description will explain the operation of the digital copying machine.

When a print request is made in S1 (see FIG. 7), the digital copying machine turns on the main motor 70 (S71), resets the discharged-sheet counter so that the count of discharged sheets is zero (S72), and judges whether the count of the discharged sheets exceeds the maximum capacity N of the face-down tray 10 (S73). In S73, if the count of discharged sheets is equal to or less than N, the normal setting for discharging the recording sheets to the face-down tray 10 is made (S74). Thereafter, the printing operation is performed according to the steps S33 to S47 shown in FIG. 8 (S76).

When the discharged-sheet sensor 68 is turned off (S77), the printing processing of a piece of the recording sheet is completed, and therefore one is subtracted from the set number of prints (S78), and one is added to the count of discharged sheets (S79). After the subtraction in S78, it is judged whether the set number of prints becomes zero (S80). If the set number of prints is zero, the printing processing has been completed. Therefore, the main motor 70 is turned off (S81), and the digital copying machine returns to the standby state.

On the other hand, if the set number of prints is not zero in S80, the printing processing has not been completed. In this case, the digital copying machine returns to S73 and checks the count of discharged sheets. When the count of discharged sheets becomes greater than N, the digital copying machine is switched to discharge the recording sheets to the face-up tray 9 (S75), and continues the printing operation.

As described above, the digital copying machine of this embodiment includes the face-down tray 10 whose capacity is smaller than the capacity of the face-up tray 9. When the printing processing exceeding the capacity of the face-down tray 10 is performed during printing in the printer mode, this digital copying machine switches the discharge direction of the recording sheet to the discharge opening for the face-up tray 9 from the discharge opening for the face-down tray 10 by the discharge-opening switching section 44, and starts to discharge the recording sheets to the face-up tray 9 in the middle of the printing operation.

There is a case in which a plurality of personal computers are connected with a network, a print request exceeding the capacity of the face-down tray 10 is made, and the printing processing exceeding the capacity of the face-down tray 10 is performed. With this structure, however, even in such a case, it is possible to reduce the occurrence of jam in the face-down tray 10 because the recording sheets are discharged to the face-up tray 9 when the count of discharged sheets exceeds the capacity of the face-down tray 10.

In the digital copying machine of Embodiment 3, before discharging the recording sheets to the face-up tray 9, i.e., when the setting for discharging the recording sheets to the face-up tray 9 is made, it is possible to temporarily store in the RAM 63 all of the image data to be discharged to the face-up tray 9, and perform the printing processing from the last page of the image data.

With this structure, all of the image data to be discharged to the face-up tray 9 are temporarily stored in the RAM 63, and then the printing processing is performed from the last page of the image data. Therefore, the recording sheets are discharged from the last page with their image-recorded side facing up to the face-up tray 9. In this case, even when the discharge direction is switched to the face-up tray 9 from the face-down tray 10, the page order of a set of the produced prints is not reversed, and the printed side faces up. Thus, the printed state can be immediately confirmed, and the user can easily handle the digital copying machine.

Embodiment 4

The following description will explain Embodiment 4 of the present invention with reference to FIGS. 11(a) to FIG. 14. For the sake of convenience of explanation, the same members as those shown in the figures of the above-mentioned embodiments will be designated with the same codes, and the explanation thereof will be omitted.

In a digital copying machine of this embodiment, when a set number of prints exceeds a maximum capacity N of the small-capacity face-down tray 10, a switchback operation is performed, and the recording sheets are discharged to the large-capacity face-up tray 9 from the beginning of the printing operation.

Figure 11A:
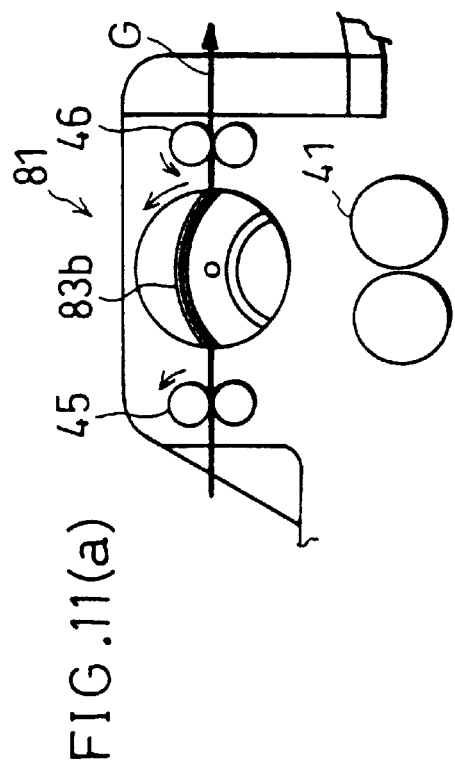
FIG. 11(a) is an explanatory view showing the movement of a recording sheet from a face-down tray toward a face-up tray in a switchback section of a digital copying machine according to Embodiment 4 of the present invention.
Figure 11C:
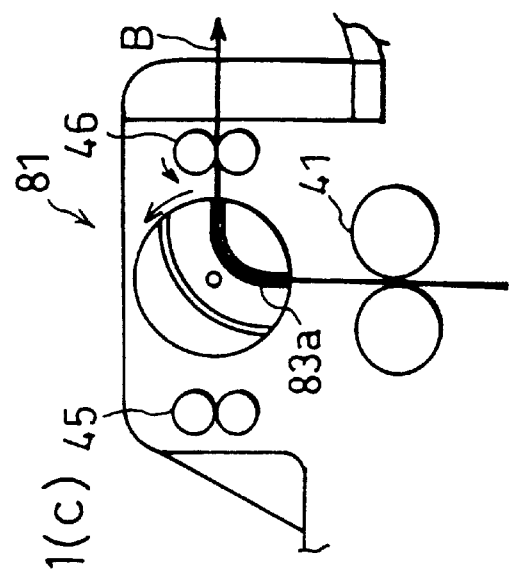
FIG. 11(c) is an explanatory view showing the movement of a recording sheet from the fixing roller toward the face-up tray in the switchback section of the digital copying machine of FIG. 11(a).
Figure 11B:
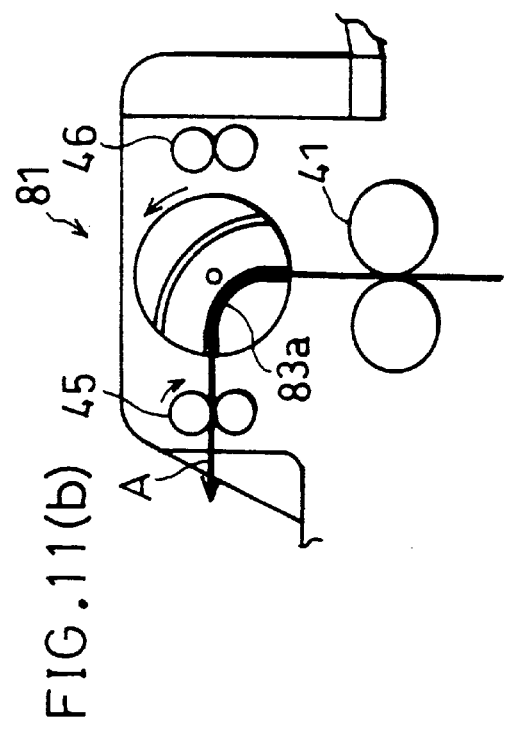
FIG. 11(b) is an explanatory view showing the movement of a recording sheet from a fixing roller toward the face-down tray in the switchback section of the digital copying machine of FIG. 11(a).

This digital copying machine has a switchback section 81 shown in FIGS. 11(a), 11(b), 11(c), instead of the discharge-opening switching section 44 of Embodiment 1. Moreover, the CPU 61 of the digital copying machine includes a volume judging section for judging whether the set number of prints is greater than the maximum capacity N of the face-down tray 10 when a print request is made. The CPU 61 instructs the switchback section 81 to perform the switchback operation according to the judgement.

Figure 12:
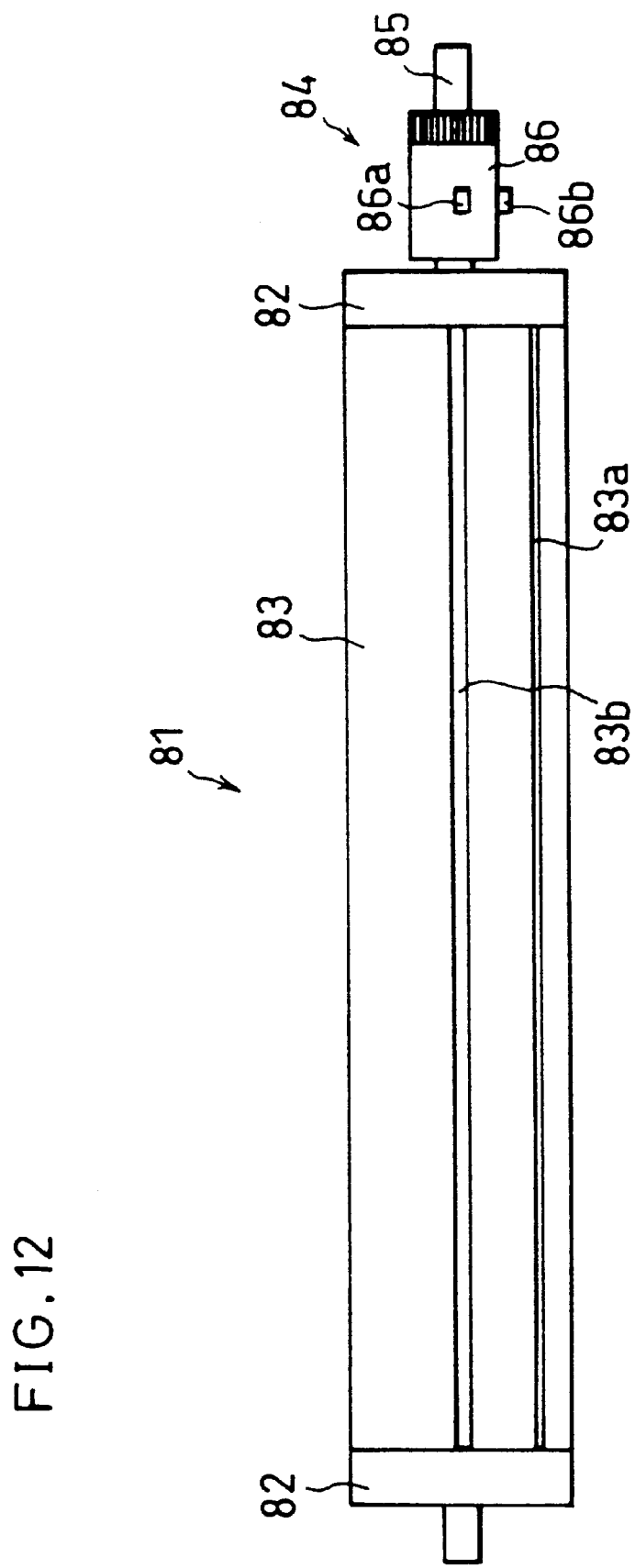
FIG. 12 is a side view of the switchback section.

FIG. 12 shows a side view of the structure of the switchback section 81.

The switchback section 81 includes a cylinder 83 held between support members 82, and a clutch 84 connected to one of the support members 82. The cylinder 83 includes paths 83a and 83b. The recording sheet passes through the path 83a during the normal discharge operation, or the first stage of the switchback operation. The recording sheet passes through the path 83b in the second stage of the switchback operation.

Figure 13:
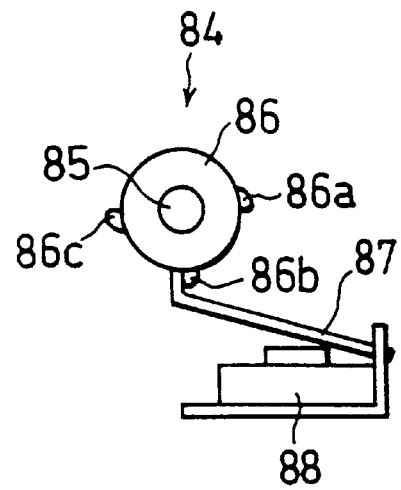
FIG. 13 is a front view showing the structure of a clutch and a solenoid in the switchback section.

The clutch 84 includes a cylinder 86 connected to the support member 82 through a rotation shaft 85. As illustrated in FIG. 13, hooks 86a and 86c are attached to the surface of the cylinder 86 so that the hooks 86a and 86c face the opposite directions. Moreover, a hook 86b is mounted in the middle position between the hooks 86a and 86c.

Furthermore, the switchback section 81 includes a switching solenoid 88 having an arm 87 which catches either the hook 86a, 86b, or 86c.

In this structure, it is arranged that the arm 87 catches the hook 86a in the normal printer mode which does not require the switchback operation. With this arrangement, the recording sheet transported from the fixing roller 41 is transported in the direction shown by arrow A (toward the face-down tray 10) in FIG. 11(b) through the path 83a and the discharge roller 45, and discharged to the face-down tray 10.

It is also arranged that the arm 87 catches the hook 86c in the copy mode. With this arrangement, the recording sheet transported from the fixing roller 41 is transported in the direction shown by arrow B (toward the face-up tray 9) in FIG. 11(c) through the path 83a and the discharge roller 46, and discharged to the face-up tray 9.

When performing the switchback operation in the printer mode, first, it is arranged so that the arm 87 catches the hook 86a, the switchback section 81 is in the state shown in FIG. 11(b), and the recording sheet is temporarily moved in the direction shown by arrow A through the path 83a. Next, the switching solenoid 88 is turned on to release the hook 86a, and the arm 87 is arranged to catch the hook 86b. As a result, the recording sheet which is moving toward the face-down tray 10 is transported in the direction shown by arrow G in FIG. 11(a) through the discharge roller 85, path 83b and discharge roller 46, and discharged to the face-up tray 9.

Like the discharge-opening switching section of Embodiment 1, it is possible to use the switchback section 81 as a discharge-opening switching section which merely switches the discharge direction of the recording sheet between the direction shown by arrow A and the direction shown by arrow B.

Figure 14:
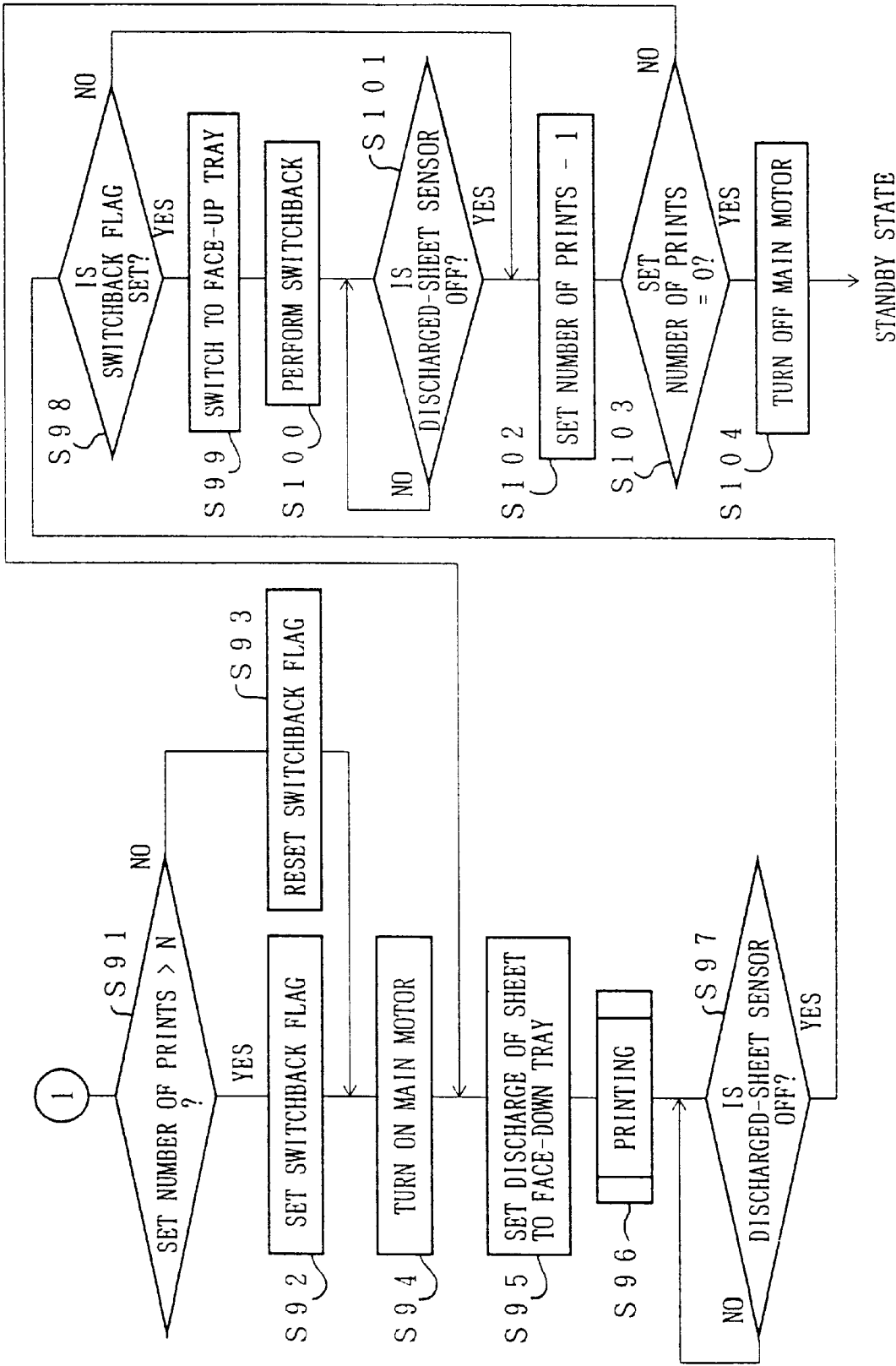
FIG. 14 is a flow chart of a switchback operation of the digital copying machine of FIG. 11(a) when the printer mode is selected.

Referring now to FIG. 14, the following description will explain the operation of the digital copying machine.

When a print request is made in S1 (see FIG. 7), the digital copying machine judges whether the set number of prints exceeds the maximum capacity N of the face-down tray 10 by the volume judging section (S91). In S91, if the set number of prints is greater than N, a switchback flag is set (S92). On the other hand, in S91, if the set number of prints is equal to or less than N, the switchback flag is reset (S93). Thereafter, the main motor 70 is turned on (S94), and the setting for discharging the recording sheets to the face-down tray 10 is made (S95). Then, the printing operation is performed according to the steps S33 to S47 shown in FIG. 8 (S96).

When the discharged-sheet sensor 68 for the face-down tray 10 is turned off (S97), it is confirmed whether the switchback flag is set (S98). In S98, if the switchback flag is set, since the set number of prints is greater than N, the discharge direction is switched using the switchback section 81 so that the recording sheet is discharged to the face-up tray 9 (S99). Then, the switchback operation is performed by rotating the discharge roller 45 in the reverse direction (S100).

Thereafter, when the discharged-sheet sensor 68 for the face-up tray 9 is turned off (S101), the digital copying machine subtracts one from the set number of prints (S102). After the subtraction in S102, it is judged whether the set number of prints becomes zero (S103). If the set number of prints is zero, the copying processing has been completed. Therefore, the main motor 70 is turned off (S104), and the digital copying machine returns to the standby state. On the other hand, if the set number of prints is not zero in S103, the copying processing has not been completed. In this case, the digital copying machine returns to S95, selects the face-down tray 10 again, and continues the printing operation.

On the other hand, when the switchback flag is reset in S98, since the set number of prints is not more than N, the normal processing is performed. More specifically, the operations of S102 to S104 are carried out without performing the switchback operation.

As described above, the digital copying machine of this embodiment includes the face-down tray 10 whose capacity is smaller than the capacity of the face-up tray 9, and the switchback section 81 for the switchback of the recording sheet transported to the discharge opening for the face-down tray 10 toward the discharge opening for the face-up tray 9. When a print request that exceeds the capacity of the face-down tray 10 is made, the switchback operation is performed by the switchback section 81, and all the recording sheets are discharged with their image-recorded side facing down to the face-up tray 9 from the beginning of the printing operation.

With this structure, like the structure of Embodiment 2, when a print request exceeding the capacity of the face-down tray 10 is made, since all of the recording sheets are discharged to the face-up tray 9, it is possible to reduce the occurrence of jam in the face-down tray 10.

In usual, the recording sheets are discharged with their image-recorded side facing down to the face-down tray 10, while the recording sheets are discharged with the image-recorded side facing up to the face-up tray 9. However, since the switchback operation is performed with respect to all of the recording sheets, the recording sheets are discharged with the image-recorded side facing down to the face-up tray 9. Thus, the page order of a set of the recording sheets discharged to the face-up tray 9 is not reversed, and the user can easily handle the digital copying machine.

Embodiment 5

Figure 15:
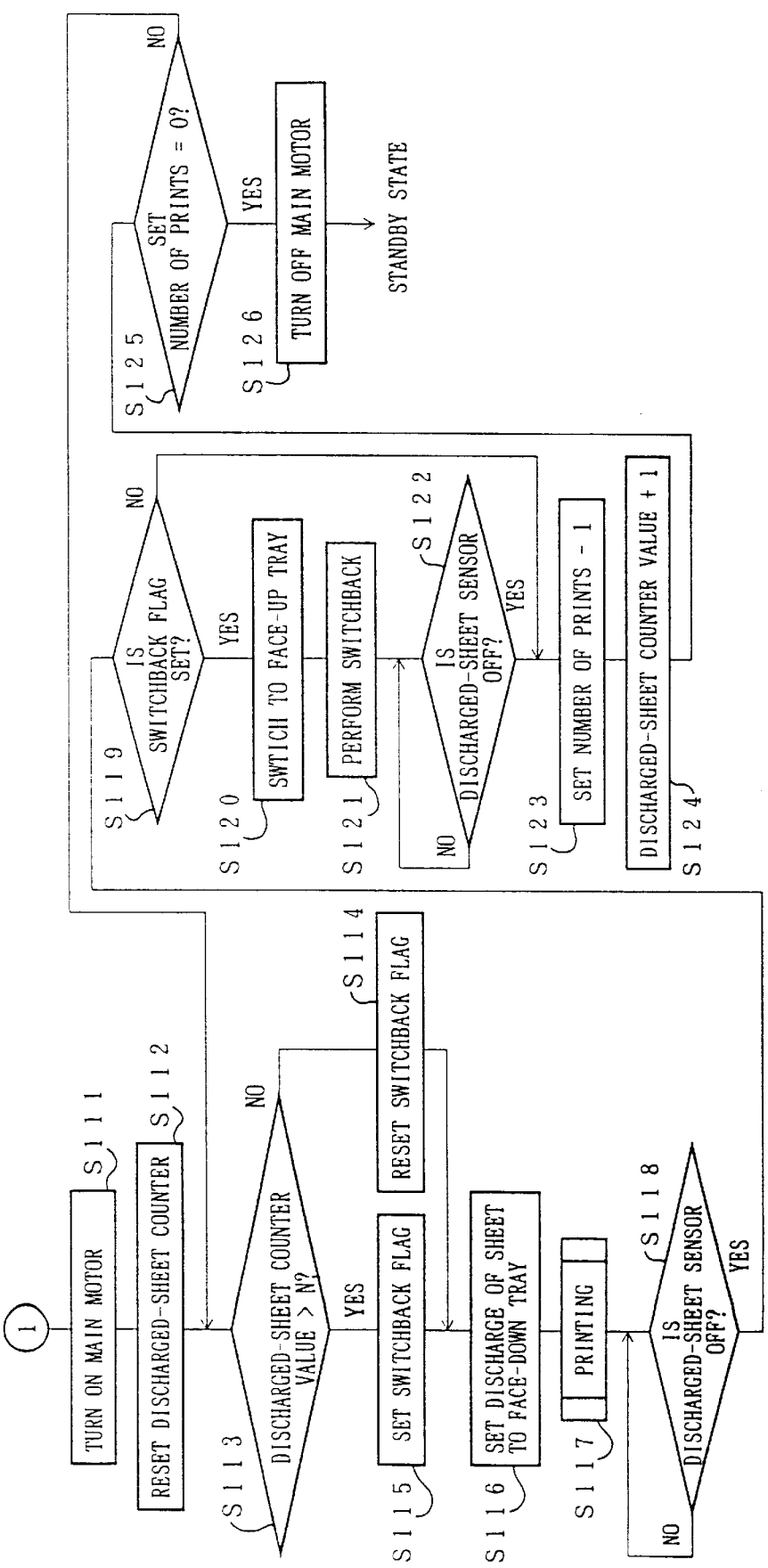
FIG. 15 is a flow chart of a switchback operation of a digital copying machine according to Embodiment 5 of the present invention when the printer mode is selected.

The following description will explain Embodiment 5 of the present invention with reference to FIG. 15. For the sake of convenience of explanation, the same members as those shown in the figures of the above-mentioned embodiments will be designated with the same codes, and the explanation thereof will be omitted.

In a digital copying machine of this embodiment, when the number of sheets that have undergone the printing processing exceeds the maximum capacity N of the small-capacity face-down tray 10, the switchback operation is performed to discharge the recording sheets to the large-capacity face-up tray 9 during the printing operation.

Like the digital copying machine of Embodiment 4, this digital copying machine has the switchback section 81 instead of the discharge-opening switching section 44 of Embodiment 1. Moreover, the CPU 61 of the digital copying machine includes a discharged-sheet counter for counting the number of the recording sheets discharged to the face-down tray 10. In addition, the CPU 61 judges whether the number of the discharged sheets is greater than the maximum capacity N of the face-down tray 10 according to the count information. When the number of the discharged recording sheets exceeds N, the CPU 61 instructs the switchback section 81 to perform the switchback operation.

Referring now to FIG. 15, the following description will explain the operation of the digital copying machine.

When a print request is made in S1 (see FIG. 7), the digital copying machine turns on the main motor 70 (S111), resets the count of the discharged-sheet counter to zero (S112), and then judges whether the count exceeds the maximum capacity N of the face-down tray 10 (S113). In S113, if the count of the discharged sheets≦N, the switchback flag is reset (S114), and the normal setting for discharging the recording sheets to the face-down tray 10 is made (S116). Thereafter, the printing operation is performed according to the steps S33 to S47 shown in FIG. 8 (S117).

When the discharged-sheet sensor 68 for the face-down tray 10 is turned off (S118), the digital copying machine confirms whether the switchback flag is set (S119). In S119, if the switchback flag is reset, since the count of the discharged sheets is not greater than N, the copying machine moves to the processing in S123 without performing the switchback operation. Then, as the printing processing of a piece of the recording sheet has been completed, one is subtracted from the set number of prints (S123), and one is added to the count of the discharged sheets (S124). After the subtraction in S123, it is judged whether the set number of prints becomes zero (S125). If the set number of prints is zero, the copying processing has been completed. Therefore, the main motor 70 is turned off (S126), and the digital copying machine returns to the standby state.

On the other hand, if the set number of prints is not zero in S125, the copying processing has not been completed. In this case, the digital copying machine returns to S113, and confirms the count of the discharged sheets. When the count of the discharged sheets becomes greater than N, the switchback flag is set (S115), and the printing operation is continued. After the processing of S118, when the digital copying machine confirms that the switchback flag is set in S119, since the count of the discharged sheets exceeds N, it is switched to a setting for discharging the recording sheets to the face-up tray 9 (S120). Then, the switchback operation is performed by rotating the discharge roller 45 in the reverse direction (S121). Thereafter, when the discharged-sheet sensor 68 for the face-up tray 9 is turned off (S122), the operations in S123 to S126 are carried out.

As described above, the digital copying machine of this embodiment includes the face-down tray 10 whose capacity is smaller than the capacity of the face-up tray 9, and the switchback section 81 for the switchback of the recording sheet transported to the discharge opening for the face-down tray 10 toward the discharge opening for the face-up tray 9. When a print request exceeding the capacity of the face-down tray 10 is made during printing in the printer mode, the switchback operation is performed in the switchback section 81, and the recording sheets are started to be discharged with their image-recorded side facing down to the face-up tray 9 in the middle of the printing operation.

With this structure, like the structure of Embodiment 3, when the printing processing is carried out on the recording sheets exceeding the capacity of the face-down tray 10 during the printing operation in the printer mode, the recording sheets to be processed after the discharge to the face-down tray 10 are discharged to the face-up tray 9. It is therefore possible to reduce the occurrence of jam in the face-down tray 10.

Furthermore, in usual, the recording sheets are discharged with their image-recorded side facing down to the face-down tray 10, while the recording sheets are discharged with their image-recorded side facing up to the face-up tray 9. However, since the switchback operation is performed with respect to all of the recording sheets to be discharged to the face-up tray 9, the recording sheets are discharged with the image-recorded side facing down to the face-up tray 9. Thus, the page order of the recording sheets discharged to the face-up tray 9 is not reversed, and the user can easily handle the digital copying machine.

Embodiment 6

The following description will explain Embodiment 6 of the present invention with reference to FIG. 16. For the sake of convenience of explanation, the same members as those shown in the figures of the above-mentioned embodiments will be designated with the same codes, and the explanation thereof will be omitted.

A digital copying machine of this embodiment checks whether the OC cover 4 is opened or closed (hereinafter referred to as the OC check) during printing. When the OC cover 4 is opened, the digital copying machine stops the discharge operation, or switches the discharge direction to the face-up tray 9 and discharges the recording sheet to the face-up tray 9.

In addition to the structure of the digital copying machine of Embodiment 1, the digital copying machine of this embodiment includes an OC sensor for detecting whether the OC cover 4 is opened or closed, and inputs an OC detection signal to the CPU 61 when the OC cover 4 is opened. The mechanism unit S of the digital copying machine includes the photoreceptor drum 35, and the PS roller 34 for adjusting the timing of the transport of the recording sheet to the photoreceptor drum 35. The CPU 61 controls the switching of the PS roller 34 between on and off, or the switching of the discharge direction by the discharge opening switching section 44 according to the OC detection signal.

Referring now to FIG. 16, the following description will explain the operation of the digital copying machine.

When a print request is made in S1 (see FIG. 7), the digital copying machine performs the feeding operation (S131) in the same manner as in S31 to S37 (see FIG. 8), and then the OC check by the OC sensor until the recording sheet reaches the PS roller (S132). When the OC cover 4 is opened in S132, the digital copying machine transports the recording sheet to the PS roller 34 (S133), stops the printing operation (S134), and then returns to S132.

When it is confirmed that the OC cover 4 is closed in S132, the digital copying machine turns on the PS clutch 72 and rotates the PS roller 34 (S135). Thereafter, laser light is emitted by the semiconductor laser light source 74 according to the image data read out from the RAM 63, and the polygon motor 21 is turned on (S136). Next, the leading-edge adjusting timer is started (S137), and an OC check timer is started (S138). The OC check timer measures the time taken for the leading edge of the recording sheet to reach the fixing unit 7 upon the passage of the leading edge through the PS roller 34. When the value of the leading-edge adjusting timer becomes zero and the leading edge is placed in position (S139), the main charger 36 and transfer charger 38 are activated and the bias power supply 75 is turned on to start a laser write operation (S140).

The value of the OC check timer is confirmed in S141, and the OC check is performed if the value of the OC check timer is not zero (S142). When it is confirmed in S142 that the OC cover is closed, the digital copying machine returns to S141, waits until the value of the OC check timer becomes zero, and performs the printing operation (S144) in the same manner as in S43 to S51 (FIG. 8). On the other hand, when it is confirmed in S142 that the OC cover is opened, the digital copying machine switches the discharge-opening switching section 44 so that the recording sheet is discharged to the face-up tray 9 (S143), and performs the printing operation (S144).

As described above, when the OC cover 4 is opened before the recording sheet reaches the PS roller 34 during the printing operation in the printer mode, the digital copying machine of this embodiment transports the recording sheet to the PS roller 34 and stops the printing operation, and resumes the transport of the recording sheet which is stopped on the PS roller 34 at the time the OC cover 4 is closed next time.

In this structure, when the OC cover 4 is opened before the recording sheet reaches the PS roller 34, i.e., the recording sheet is registered, the printing operation is stopped and the recording sheet is not discharged to the face-down tray 10. It is therefore possible to prevent a jam from occurring in the face-down tray due to the opening and closing operation of the OC cover 4 located under the face-down tray 10. Moreover, since the recording sheet is transported to the PS roller 34 when the OC cover 4 is opened, it is possible to promptly perform the processing at the time the transport is resumed.

Furthermore, when the OC cover 4 is opened before the fixing of the toner image to the recording sheet is completed, the discharge direction is switched to the discharge opening for the face-up tray 9 from the discharge opening for the face-down tray 10 by the discharge-opening switching section 44, and the recording sheet is discharged to the face-up tray 9.

In this structure, when the OC cover 4 is opened before the toner image is fixed, the recording sheet is not discharged to the face-down tray 10, but is discharged to the face-up tray 9. It is thus possible to prevent a jam from occurring in the face-down tray 10 due to the opening and closing operation of the OC cover 4 located below the face-down tray 10.

In addition, it is possible to combine the structure of Embodiment 6 with the structure of Embodiment 3 or 5. In this case, even when the OC cover 4 is opened or closed in a digital copying machine having the structure of Embodiment 3 or 5, it is possible to prevent a jam in the face-down tray 10.

Embodiment 7

Figure 17:
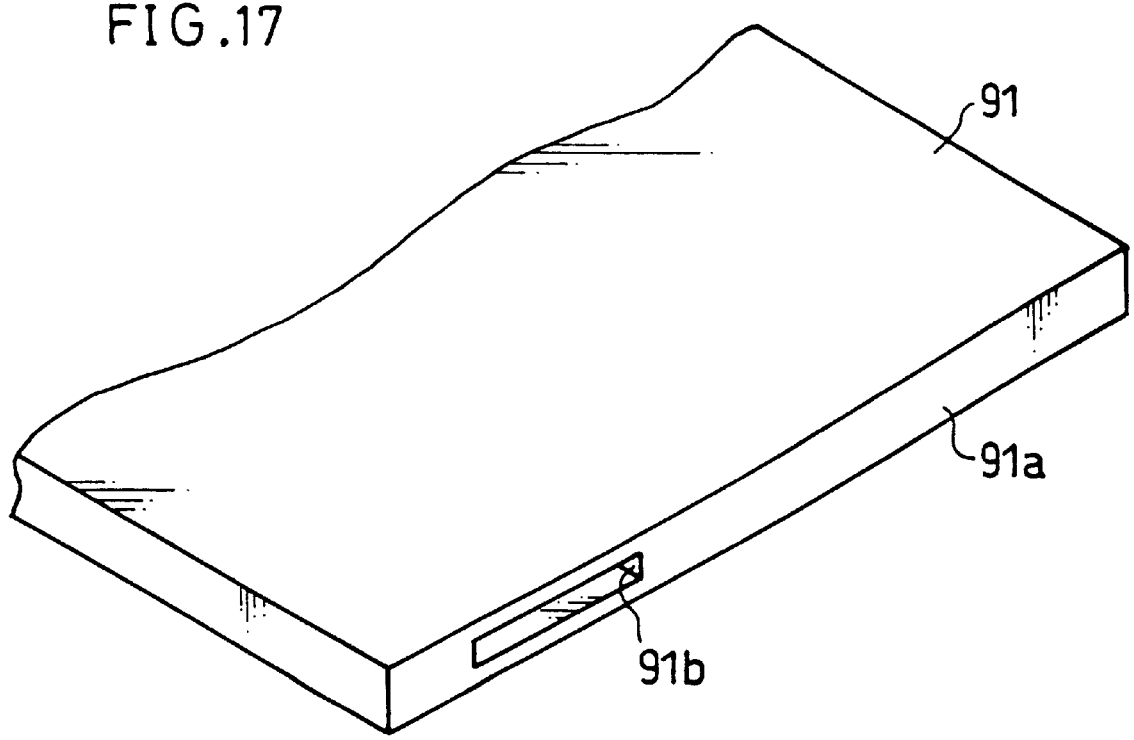
FIG. 17 is a perspective view showing the structure on the OC cover side of an open-and-close operation inhibiting section of a digital copying machine according to Embodiment 7 of the present invention.
Figure 18:
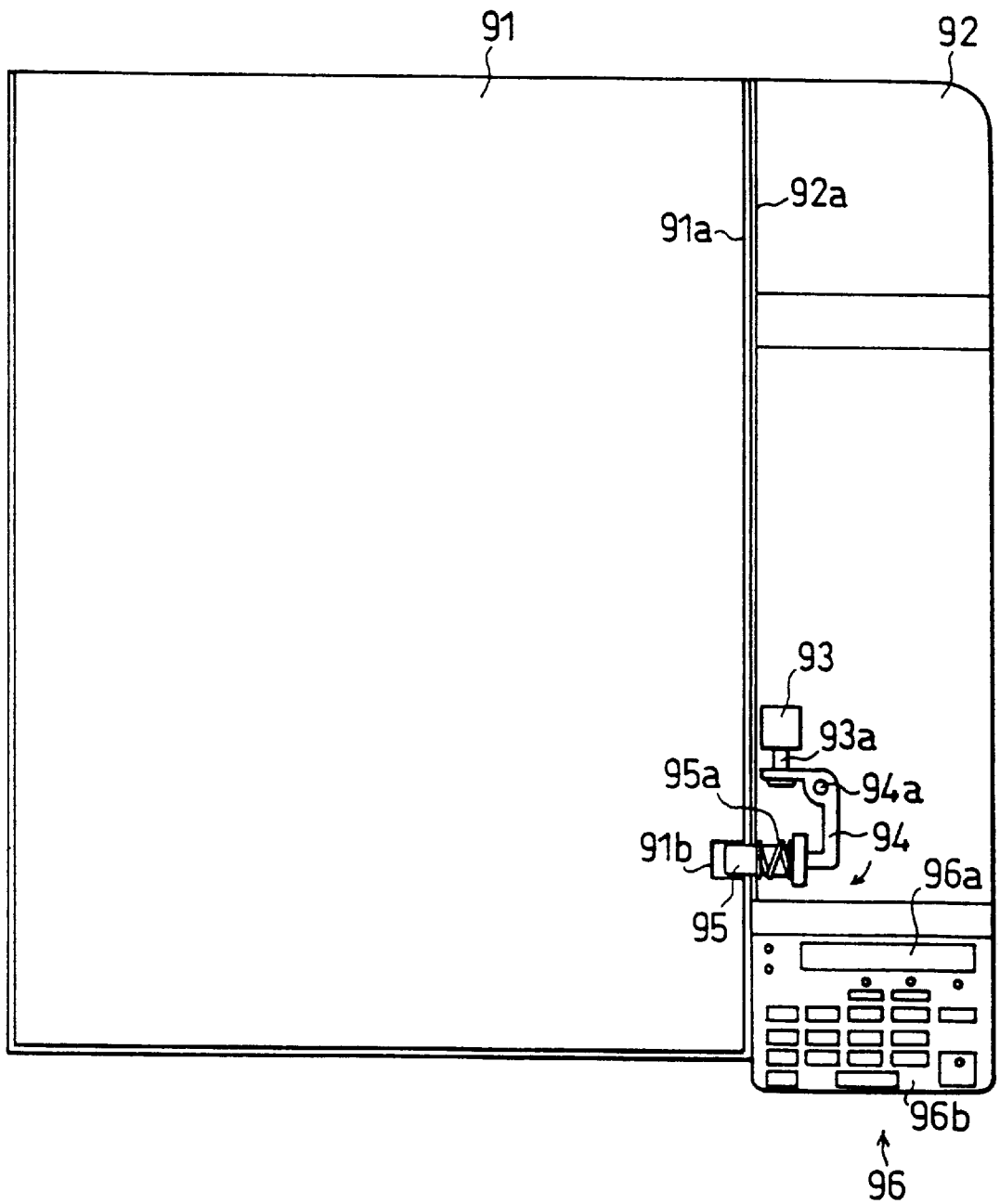
FIG. 18 is a plan view showing the structure of the open-and-close operation inhibiting section of the digital copying machine of FIG. 17.

The following description will explain Embodiment 7 of the present invention with reference to FIGS. 17 and 18. For the sake of convenience of explanation, the same members as those shown in the figures of the above-mentioned embodiments will be designated with the same codes, and the explanation thereof will be omitted.

As illustrated in FIG. 18, the digital copying machine of this embodiment includes an OC (open-and-close operation) inhibiting section for inhibiting the opening or closing of an OC cover 91 during the printing operation. The OC cover 91 has the same structure as the OC cover 4 of Embodiment 1, except for a slot 91b. In FIGS. 17 and 18, the illustration of the face-down tray 10 is omitted.

The OC cover 91 is provided with the slot 91b formed on a side face 91a opposite to a side face 92a of an upper external wall 92 in the spaces $SP_3$, $SP_4$ of the copying machine main body (see FIG. 2). Inside the external wall 92, there are a solenoid 93 having a core 93a, and a lock arm 94 that is connected to the core 93a and fastened rotatably with a shaft 94a. The lock arm 94 is also connected to an OC cover lock plate 95 on which an unlocking spring 95a is wound. The OC cover lock plate 95 can be inserted or removed from the slot 91b. Additionally, an operation panel 96 is mounted on the outside face of the upper external wall 92. The operation panel 96 is provided with a liquid crystal display device 96a for displaying the operation state, and a switch group 96b including a print switch.

Namely, the OC inhibiting section is formed by the slot 91b, solenoid 93, core 93a, lock arm 94, shaft 94a, OC cover lock plate 95, and unlocking spring 95a.

In this structure, in the printer mode, when the PS sensor 40 is turned on, the digital copying machine switches the solenoid 93 on. As a result, the core 93a is sucked into the solenoid 93, and the lock arm 94 rotates clockwise on the shaft 94a as shown in FIG. 18. Consequently, the OC cover lock plate 95 is inserted into the slot 91b, and the OC cover 91 is locked. At this time, the unlocking spring 95a is pushed toward the slot 91b.

On the other hand, when the discharged-sheet sensor 68 is turned off, the digital copying machine switches the solenoid 93 off. As a result, the suction force of the solenoid 93 is eliminated. Consequently, the OC cover lock plate 95 is removed from the slot 91b due to the elastic force of the unlocking spring 95a, and the OC cover 91 is unlocked. Moreover, in the copy mode and in the printer mode other than a period between the turning on of the PS sensor 40 and the turning off of the discharged-sheet sensor 68, the OC cover 91 is unlocked.

As described above, the digital copying machine of this embodiment includes the OC inhibiting section for inhibiting the opening and closing of the OC cover 91 during printing in the printer mode. In this structure, since the opening or closing of the OC cover (document cover) is inhibited by the OC inhibiting section during printing, it is possible to prevent a jam in the face-down tray 10.

In addition, it is possible to combine the structure of Embodiment 7 with the structure of Embodiment 3 or 5. In this case, it is possible to prevent a jam from occurring in the fade-down tray 10 of a digital copying machine having the structure of Embodiment 3 or 5 in the course of printing.

Embodiment 8

Figure 19:
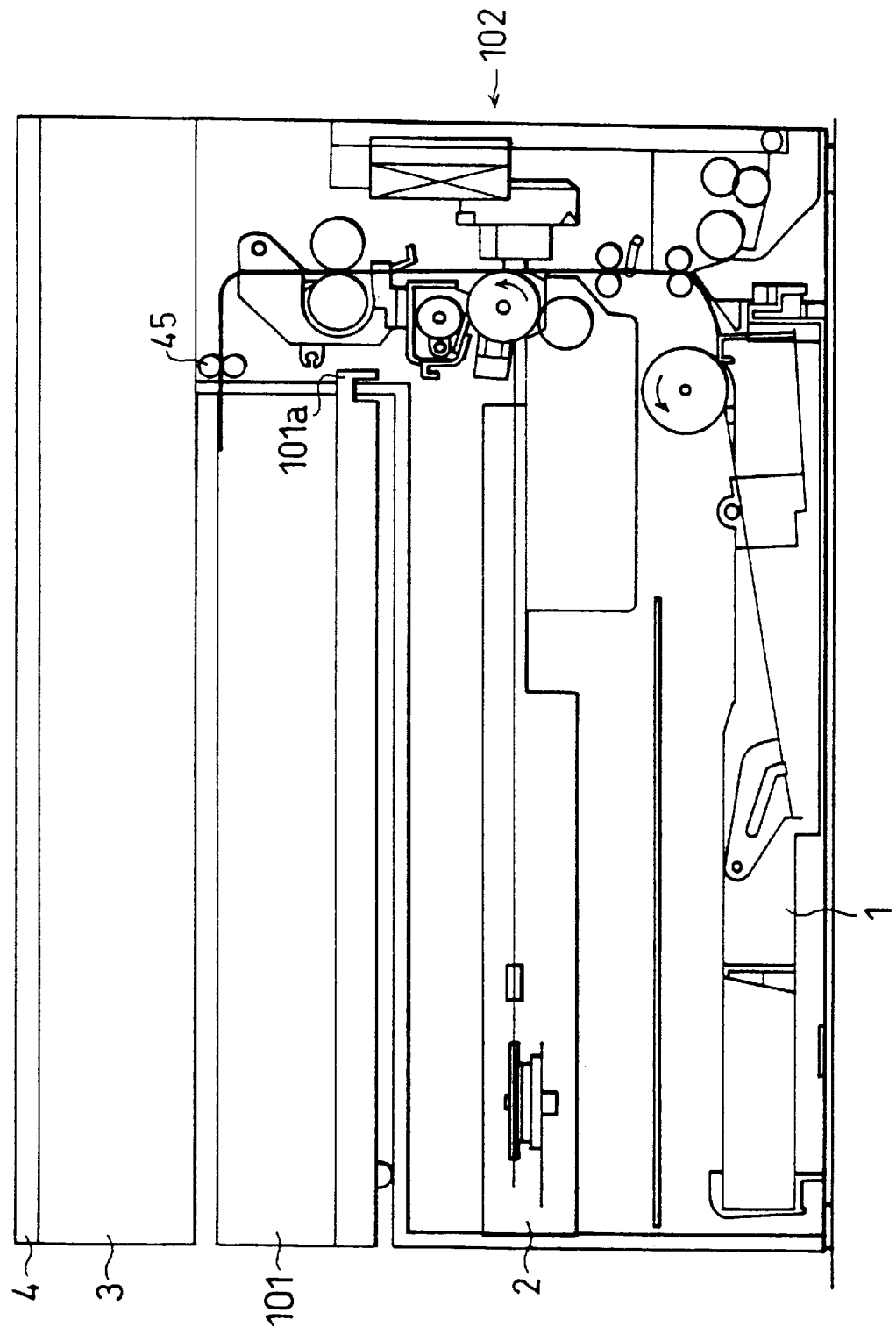
FIG. 19 is a central cross section showing the structure of a digital copying machine according to Embodiment 8 of the present invention.
Figure 20:
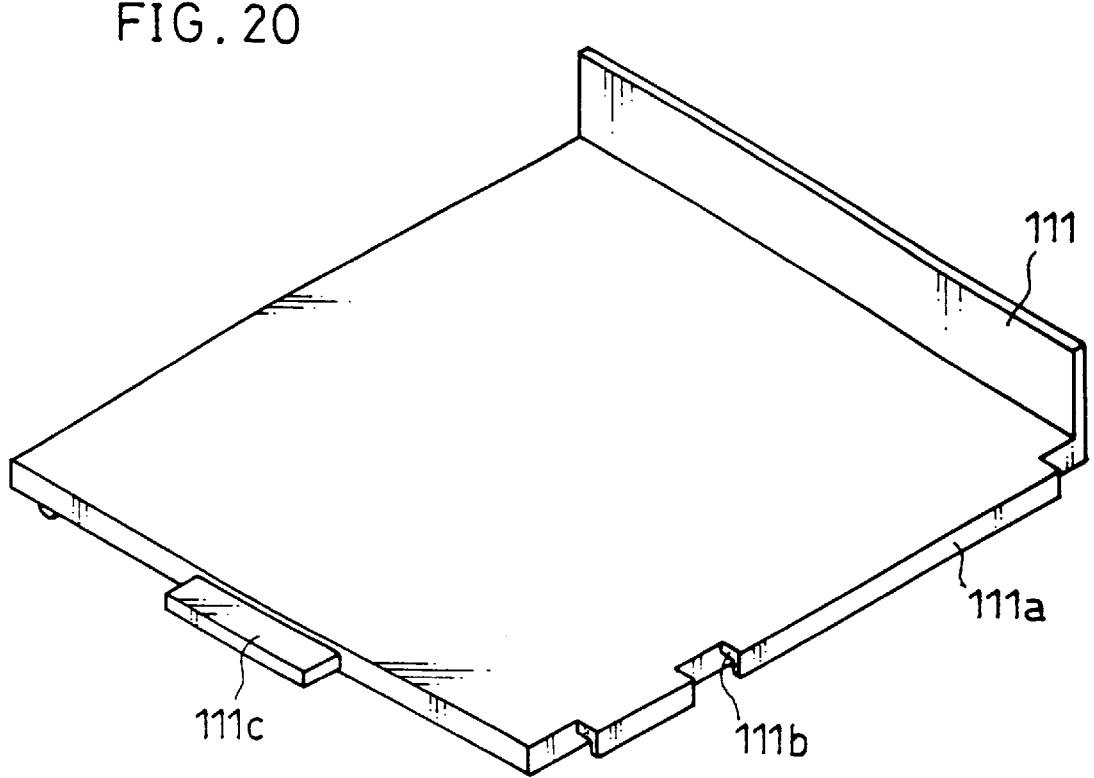
FIG. 20 is a perspective view showing another structure of a discharge tray in the digital copying machine of FIG. 19.
Figure 21:
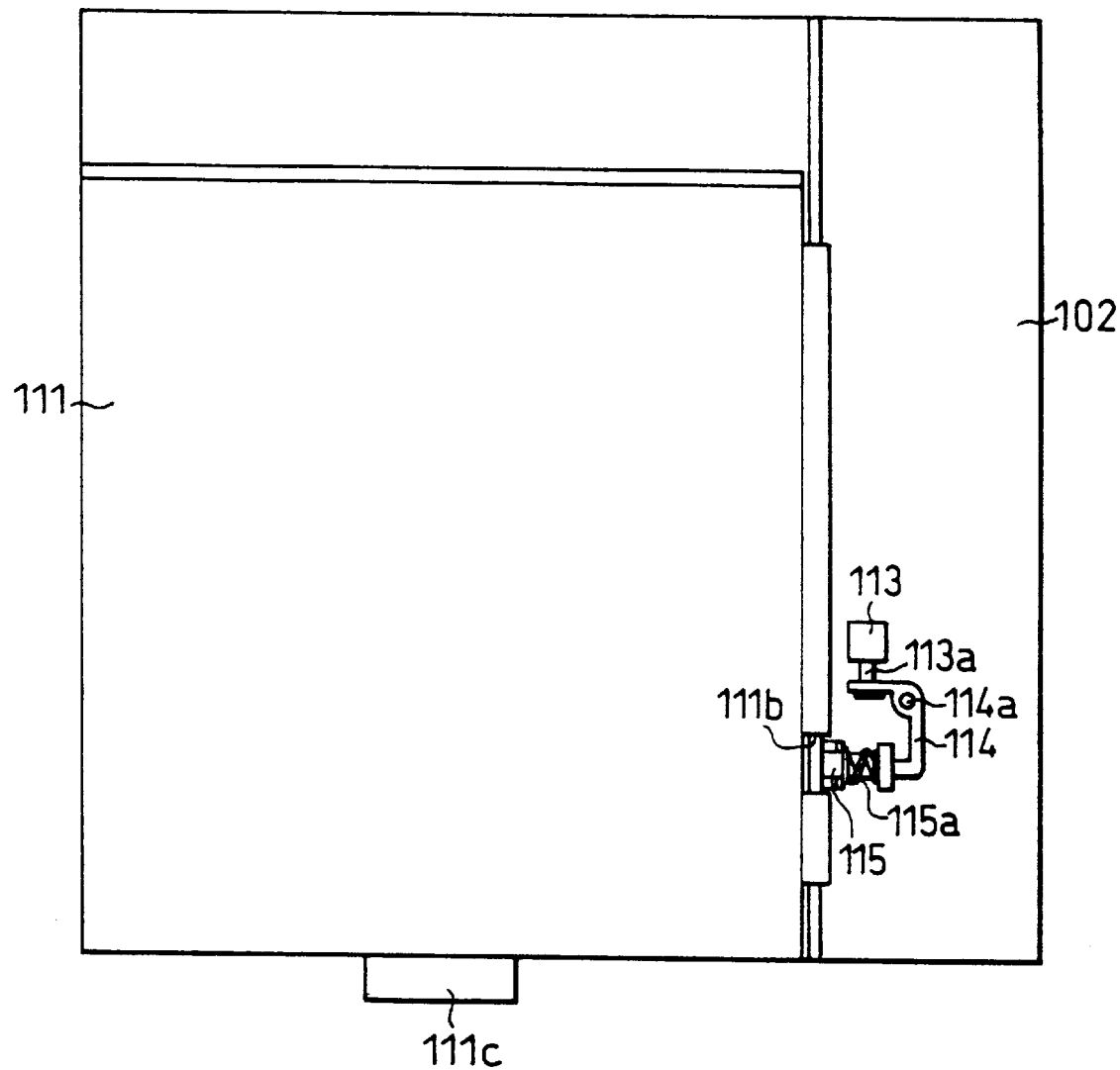
FIG. 21 is a plan view showing the structure of a pull-operation inhibiting section of the digital copying machine of FIG. 19.

The following description will explain Embodiment 8 of the present invention with reference to FIGS. 19 to 21. For the sake of convenience of explanation, the same members as those shown in the figures of the above-mentioned embodiments will be designated with the same codes, and the explanation thereof will be omitted.

A digital copying machine of this embodiment includes a drawer-type discharge tray instead of the face-down tray 10 of Embodiment 1. More specifically, as shown in FIG. 19, this digital copying machine includes the feed cassette 1, laser write unit 2, a discharge tray 101, the document scanning unit 3, and OC cover 4 arranged in this order from the bottom of the main body. Additionally, a mechanism unit 102 is positioned beside a block of the feed cassette 1, laser write unit 2 and discharge tray 101 which are arranged vertically.

An end 101a of the discharge tray 101 is inserted into the mechanism unit 102. The discharge tray 101 can be pulled out by sliding it toward the front face of the copying machine main body.

The mechanism unit 102 has the same structure of the mechanism unit 5 of Embodiment 1, except for the discharge-opening switching section 44 and discharge roller 46.

As described above, the digital copying machine of this embodiment includes the drawer-type discharge tray 101 between the document scanning unit 3 and the laser write unit 2.

Compared to a structure in which the face-down tray 10 is positioned over the OC cover 4 like Embodiment 1, the overall height of a device having the structure of Embodiment 8 is increased. However, in the structure of Embodiment 8, since the discharge tray 101 is of the drawer type, it is possible to slide the discharge tray 101 toward the front face of the copying machine main body, and easily remove the recording sheet.

As shown in FIG. 20, the digital copying machine of Embodiment 8 may include a pull-operation inhibiting section for inhibiting the discharge tray 101 from being pulled during the printing operation.

More specifically, the discharge tray 111 of the digital copying machine is formed by a plate having a L-shaped cross section. The discharge tray 111 has a handle 111c on its front face, and a slot 111b in the vicinity of the center of its side face 111a adjacent to the mechanism unit 102.

On the other hand, as illustrated in FIG. 21, in the inside of the mechanism unit 102, there are a solenoid 113 having a core 113a, and a lock arm 114 that is connected to the core 113a and is fastened rotatably with a shaft 114a. The lock arm 114 is connected to a discharge tray stopper 115 on which an unlocking spring 115a is wound. The discharge tray stopper 115 can be inserted or removed from the slot 111b.

Namely, the pull-operation inhibiting section is turned by the slot 111b, solenoid 113, core 113a, lock arm 114, shaft 114a, discharge tray stopper 115, and unlocking spring 115a.

In this structure, when the PS sensor 40 is turned on in the printer mode, the digital copying machine switches the solenoid 113 on. As a result, the core 113a is sucked into the solenoid 113, and the lock arm 114 rotates clockwise on the shaft 114a as shown in FIG. 21. Consequently, the discharge tray stopper 115 is inserted into the slot 111b, and the discharge cover 111 is locked. At this time, the unlocking spring 115a is pushed toward the slot 111b.

On the other hand, the digital copying machine switches the solenoid 113 off when the discharged-sheet sensor 68 is turned off. As a result, the suction force of the solenoid 113 is eliminated. Consequently, the discharge tray stopper 115 is removed from the slot 111b due to the elastic force of the unlocking spring 115a, and the discharge tray 111 is unlocked. Moreover, in the copy mode and in the printer mode other than a period between the turning on of the PS sensor 40 and the turning off of the discharged-sheet sensor 68, the discharge tray 111 is unlocked.

In this structure, since the pulling of the discharge tray 111 is inhibited by the pull-operation inhibiting section during printing, it is possible to prevent a jam in the discharge tray 111.

In addition, in the digital copying machine of Embodiment 8, although the switching of the discharge openings is not performed, it is possible to provide the mechanism unit 102 with the discharge-opening switching section, discharge roller, and face-up tray like the mechanism unit 5 of Embodiment 1.

Figure 22:
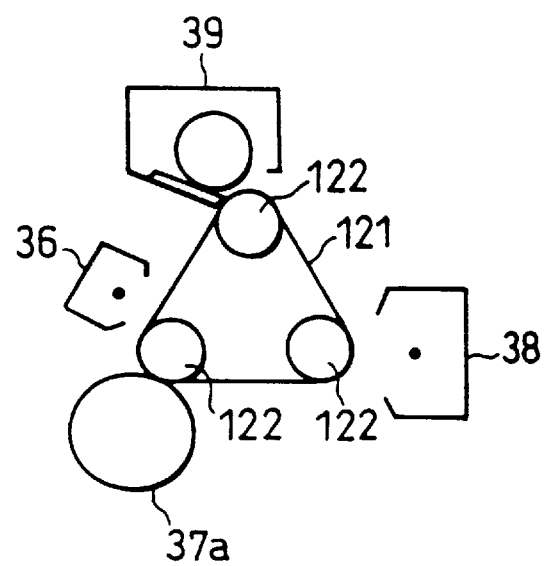
FIG. 22 is a front view showing the structure of an image carrier of a digital copying machine of the present invention.

In Embodiments 1 to 8, although the photoreceptor drum is used as an image carrier, the image carrier is not necessarily limited to the photoreceptor drum. As illustrated in FIG. 22, for example, it is possible to use as the image carrier a photoreceptor belt 121 that is supported and rotated by three support members 122. However, it is preferred to use the photoreceptor drum because of its high precision.

According to Embodiments 2 to 7, when the recording sheet is discharged to the face-up tray 9 during printing, it is possible to arrange the digital copying machine to store the number of the recording sheets discharged to the face-down tray 10, subtract the number of the discharged recording sheets from the number of the printed sheets at the time the print processing of a preset number of the recording sheets is completed, and display the calculated value on the liquid crystal display device (display section) on the operation panel.

In this structure, it is possible to count the number of pages of the recording sheets discharged to the face-up tray 9, and display the number of pages after the completion of the printing operation. Namely, the user can be informed of the discharge of the recording sheet to the face-up tray 9 and the number of pages. This structure eliminates the necessity of finding which tray contains the discharged recording sheet. The display of such information is particularly effective when the recording sheets are discharged to both of the face-down tray 10 and face-up tray 9 by the switching operation, or switchback operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital image forming apparatus comprising:

a feed section for feeding a recording sheet;

a document scanning section for reading an image on a document by scanning the document;

a write section, located between said feed section and said document scanning section, for writing image data of the document; and a mechanism section including an image carrier for carrying a developer image formed according to the image data written by said write section, for transferring and fixing the developer image to the recording sheet, said mechanism section being located beside a block of said feed section, write section and document scanning section which are arranged vertically, wherein a scanning direction of the document by said document scanning section is equal to a longitudinal direction of said image carrier of said mechanism section.

2. The digital image forming apparatus as set forth in claim 1, further comprising between said document scanning section and said write section a discharge section capable of being pulled out.

3. The digital image forming apparatus as set forth in claim 2, further comprising a pull-operation inhibiting section for inhibiting said discharge section from being pulled out during a discharge operation of the recording sheet to said discharge section.

4. A digital image forming apparatus comprising:

a feed section for feeding a recording sheet;

a document scanning section for reading an image on a document by scanning the document;

a mechanism section for transferring and fixing a developer image formed according to the image data written by said write section, said mechanism section being located beside a block of said feed section, write section and document scanning section which are arranged vertically, wherein said transfer of said developer image takes place along an axis parallel to the direction of scanning.

5. The digital image forming apparatus as set forth in claim 4, further comprising between said document scanning section and said write section a discharge section capable of being pulled out.

6. The digital image forming apparatus as set forth in claim 5, further comprising a pull-operation inhibiting section for inhibiting said discharge section from being pulled out during a discharge operation of the recording sheet to said discharge section.

7. A digital image forming apparatus comprising:

a feed section for feeding a recording sheet;

a document scanning section for reading an image on a document by scanning the document;

a write section, located between said feed section and said document scanning section, for writing image data of the document or image data from an external device;

a mechanism section for transferring and fixing a developer image formed according to the image data written by said write section to the recording sheet, said mechanism section being located beside a block of said feed section, write section and document scanning section which are arranged vertically;

a first discharge section and a document cover provided above said document scanning section;

a second discharge section disposed on a side of the apparatus opposite to said first discharge section with respect to said mechanism section; and a discharge-opening switching section for switching discharge openings so that the recording sheet is discharged with its image-recorded side-facing down to said first discharge section during a printer mode for recording the image data from the external device, and the recording sheet is discharged with the image-recorded side facing up to said second discharge section during a copy mode for recording the image data of the document.

8. The digital image forming apparatus as set forth in claim 7, wherein a capacity of said first discharge section is less than a capacity of said second discharge section, and when a print request exceeding the capacity of said first discharge section is made, said discharge-opening switching section switches a discharge direction of the recording sheet to the discharge opening for said second discharge section from the discharge opening for said first discharge section so that all of the recording sheets are discharged to said second discharge section from beginning.

9. The digital image forming apparatus as set forth in claim 8, further comprising a memory section for storing the image data from the external device, wherein all the image data are temporarily stored in said memory section before discharging the recording sheets to said second discharge section, and print processing is performed on the image data sequentially from a last page of the image data.

10. The digital image forming apparatus as set forth in claim 7, wherein a capacity of said first discharge section is less than a capacity of said second discharge section, and when print processing is performed on the recording sheets exceeding the capacity of said first discharge section during printing in the printer mode, said discharge-opening switching section switches a discharge direction of the recording sheet to the discharge opening for said second discharge section from the discharge opening for said first discharge section so that the recording sheets are started to be discharged to said second discharge section midway through printing.

11. The digital image forming apparatus as set forth in claim 10, further comprising a memory section for storing the image data from the external device, wherein all the image data to be discharged to said second discharge section are temporarily stored in said memory section before discharging the recording sheets to said second discharge section, and print processing is performed on the image data sequentially from a last page of the image data.

12. The digital image forming apparatus as set forth in claim 7, further comprising a switchback section for performing switchback of the recording sheet transported to the discharge opening for said first discharge section toward the discharge opening for said second discharge section.

13. The digital image forming apparatus as set forth in claim 12, wherein a capacity of said first discharge section is less than a capacity of said second discharge section, and when a print request exceeding the capacity of said first discharge section is made, said switchback section performs switchback of the recording sheets so that all of the recording sheets are discharged to said second discharge section from beginning.

14. The digital image forming apparatus as set forth in claim 12, wherein a capacity of said first discharge section is less than a capacity of said second discharge section, and when print processing is performed on the recording sheets exceeding the capacity of said first discharge section during printing in the printer mode, switchback of the recording sheets is performed so that the recording sheets are started to be discharged with their image-recorded side facing down to said second discharge section midway through printing.

15. The digital image forming apparatus as set forth in claim 7, wherein said mechanism section includes an image carrier for carrying a developer image, and a transport timing adjusting section for adjusting timing of a transport of the recording sheet to said image carrier, wherein when the document cover is opened in a period in which printing is being performed in the printer mode and the recording sheet has not reached said transport timing adjusting section, said mechanism section transports the recording sheet to said transport timing adjusting section, stops printing, and resumes the transport of the recording sheet stopped at said transport timing adjusting section when said document cover is closed next time.

16. The digital image forming apparatus as set forth in claim 7, wherein when the document cover is opened in a period in which printing is being performed in the printer mode and fixing of the developer image to the recording sheet has not been completed, said discharge-opening switching section switches a discharge direction of the recording sheet to the discharge opening for said second discharge section from the discharge opening for said first discharge section so that the recording sheet is discharged to said second discharge section.

17. The digital image forming apparatus as set forth in claim 7, further comprising an open-and-close operation inhibiting section for inhibiting opening and closing of said document cover during printing in the printer mode.

18. The digital image forming apparatus as set forth in claim 7, further comprising a discharged-sheet counter for counting the number of the recording sheets discharged to said second discharge section.

19. The digital image forming apparatus as set forth in claim 18, further comprising a display section for displaying the number of the recording sheets counted by said discharged-sheet counter after printing.

20. A digital image forming apparatus comprising:

a feed section for feeding a recording sheet having an image-receiving surface;

a scanning section for scanning an image in a first direction in a first plane so as to sequentially create digital image information corresponding to the scanned portions of the image, and for outputting said digital image information; and a duplication section including a longitudinal printing axis parallel to said first direction and a transport means for transporting a recording sheet from said feed section such that said recording sheet passes said printing axis in a second direction with said print receiving surface thereof aligned with, and located adjacent and parallel to, said printing axis in a second plane, said second plane being perpendicular to said first plane;

wherein said duplication section is adapted to receive said digital image information, and to use said digital image information to respectively duplicate the scanned portions of said image on said print receiving surface of said recording sheet along said longitudinal printing axis such that said image being printed is duplicated on said print receiving surface of said recording sheet.

21. The digital imaging apparatus as set forth in claim 20, further comprising a discharge section capable of being pulled out.

22. The digital imaging apparatus as set forth in claim 21, further comprising a pull-operation inhibiting section for inhibiting said discharge section from being pulled out during a discharge operation of the recording sheet to said discharge section.

23. The digital imaging apparatus as set forth in claim 20, wherein said duplication section is adapted to receive digital image information alternatively either from said scanning section or from an external source.

24. The digital imaging apparatus as set forth in claim 23, wherein said apparatus further comprises:

a first discharge section and a document cover provided above said scanning section;

a second discharge section disposed on a side of the apparatus opposite to said first discharge section; and a discharge-opening switching section for switching discharge openings so that the recording sheet is discharged with its print receiving side facing down to said first discharge section during a printer mode for recording image information from the external device, and the recording sheet is discharged with its print receiving side facing up to said second discharge section during a copy mode for recording the image information from said scanner section.

25. The digital image forming apparatus as set forth in claim 24, wherein:

a capacity of said first discharge section is less than a capacity of said second discharge section, and when a print request exceeding the capacity of said first discharge section is made, said discharge opening switching section switches a discharge direction of the recording sheet to the discharge opening for the second discharge section from the discharge opening for the first discharge section so that all of the recording sheets are discharged to said second discharge section from the beginning.

26. The digital image forming apparatus as set forth in claim 25, further comprising a memory section for storing the image information received from the external device, wherein all of the image information is temporarily stored in said memory section before discharging the recording sheets to said second discharge section, and print processing is performed on the image information sequentially from the last page of the image information.

27. The digital image forming apparatus as set forth in claim 24, wherein a capacity of said first discharge section is less than a capacity of said second discharge section, and when print processing is performed on the recording sheets exceeding the capacity of said first discharge section during printing in a printing mode, said discharge-opening switching section switches a discharge direction of the recording sheet to the discharge opening for the second discharge section from the discharge opening for the first discharge section so that the recording sheets are started to be discharged to said second discharge section midway through printing.

28. The digital image forming apparatus as set forth in claim 27, further comprising a memory section for storing the image information from the external device, wherein all of the image information to be discharged to said second discharge section are temporarily stored in said memory section before discharging the recording sheets to said second discharge section, and print processing is performed on the image information sequentially from the last page of the image information.

29. The digital image forming apparatus of claim 24, further comprising a switchback section for performing switchback of the recording sheet transported to the discharge opening for said first discharge section toward the discharge opening for said second discharge section.

30. The digital image forming apparatus as set forth in claim 29, wherein a capacity of said first discharge section is less than a capacity of said second discharge section, and when a print request exceeding the capacity of said first discharge section is made, said switchback section performs switchback of the recording sheets so that all of the recording sheets are discharged to said second discharge section from the beginning.

31. The digital image forming apparatus as set forth in claim 29, wherein a capacity of said first discharge section is less than a capacity of said second discharge section, and when print processing is performed on the recording sheets exceeding the capacity of said first discharge section during printing in the printer mode, switchback of the recording sheets is performed so that the recording sheets are started to be discharged with their print receiving sides facing down to said second discharge section midway through printing.

32. The digital image forming apparatus as set forth in claim 24, further comprising an open-and-close operation inhibiting section for inhibiting opening and closing of said document cover during printing in the printer mode.

33. The digital image forming apparatus as set forth in claim 24, further comprising a discharged-sheet counter for counting the number of recording sheets discharged to said second discharge section.

34. The digital image forming apparatus as set forth in claim 33, further comprising a display section for displaying the number of the recording sheets counted by said discharged-sheet counter after printing.

* * * * *

UNITED STATES PATENT AND TRADEMARK OFFICE
CERTIFICATE OF CORRECTION

| | | |
|---|---|---|
| PATENT NO. | : 6,085,063 | Page 1 of 1 |
| APPLICATION NO. | : 09/039026 | |
| DATED | : July 4, 2000 | |
| INVENTOR(S) | : Kiwamu Morita | |

It is certified that error appears in the above-identified patent and that said Letters Patent is hereby corrected as shown below:

In the Claims

Column 25, line 55

Claim 4 is corrected to read as follows:

4. A digital image forming apparatus comprising:

a feed section for feeding a recording sheet;

a document scanning section for reading an image on a document by scanning the document;

a write section, located between said feed section and said document scanning section, for writing image data of the document; and a mechanism section for transferring and fixing a developer image formed according to the image data written by said write section, said mechanism section being located beside a block of said feed section, write section and document scanning section which are arranged vertically, wherein said transfer of said developer image takes place along an axis parallel to the direction of scanning.

Signed and Sealed this
Twenty-fifth Day of February, 2014

Michelle K. Lee
*Deputy Director of the United States Patent and Trademark Office*